United States Patent
McGeer

(10) Patent No.: US 9,434,481 B2
(45) Date of Patent: Sep. 6, 2016

(54) APPARATUS AND METHOD FOR LAUNCH AND RETRIEVAL OF A HOVERING AIRCRAFT

(71) Applicant: Aerovel Corporation, White Salmon, WA (US)

(72) Inventor: Brian T. McGeer, Underwood, WA (US)

(73) Assignee: Aerovel Corporation, White Salmon, WA (US)

( * ) Notice: Subject to any disclaimer, the term of this patent is extended or adjusted under 35 U.S.C. 154(b) by 260 days.

(21) Appl. No.: 14/315,899

(22) Filed: Jun. 26, 2014

(65) Prior Publication Data

US 2015/0239578 A1 Aug. 27, 2015

Related U.S. Application Data

(60) Provisional application No. 61/881,188, filed on Sep. 23, 2013.

(51) Int. Cl.
  *B64F 1/02* (2006.01)
  *B64F 1/04* (2006.01)
  *B64C 39/02* (2006.01)

(52) U.S. Cl.
  CPC .............. *B64F 1/02* (2013.01); *B64C 39/024* (2013.01); *B64F 1/04* (2013.01); *B64C 2201/027* (2013.01); *B64C 2201/08* (2013.01);
  (Continued)

(58) Field of Classification Search
  USPC .................. 244/110 F, 110 R, 110 E, 113, 63
  See application file for complete search history.

(56) References Cited

U.S. PATENT DOCUMENTS

| 968,339 A | 8/1910 | Geraldson |
| 1,144,505 A | 6/1915 | Steffan |
| 1,306,860 A | 6/1919 | Smith |

(Continued)

FOREIGN PATENT DOCUMENTS

| CA | 781808 | 4/1968 |
| CA | 839101 | 4/1970 |

(Continued)

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (23 pp.).

(Continued)

*Primary Examiner* — Christopher P Ellis
(74) *Attorney, Agent, or Firm* — Neal, Gerber & Eisenberg LLP

(57) ABSTRACT

Various embodiments of the present disclosure provide an apparatus and method for launch and retrieval of a hovering aircraft. Generally, the apparatus of the present disclosure is configured to capture a hovering aircraft between two or more fingers of an aircraft capturer, guide the captured aircraft into a docking station for servicing and/or storage, and launch the aircraft from the docking station. The apparatus of the present disclosure is thus configured to bring the aircraft from an imprecise, irregular hover into a secure and well-controlled rest state. The tolerance of imprecision provided by the apparatus makes it particularly suited for use under a practical conditions such as aboard a small boat in a rough sea.

16 Claims, 28 Drawing Sheets

(52) U.S. Cl.
CPC ....... *B64C 2201/182* (2013.01); *Y10S 901/02* (2013.01); *Y10S 901/31* (2013.01)

(56) References Cited

U.S. PATENT DOCUMENTS

| | | | |
|---|---|---|---|
| 1,383,595 A | 7/1921 | Black | |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins, Jr. et al. | |
| 2,944,815 A | 7/1960 | Moyer | |
| 3,029,049 A | 4/1962 | Melville | |
| 3,146,974 A | 9/1964 | Petoia | |
| 3,351,325 A | 11/1967 | Cotton | |
| 3,785,316 A | 1/1974 | Leming et al. | |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,311,290 A | 1/1982 | Koper | |
| 4,523,729 A * | 6/1985 | Frick | B64F 1/04 244/115 |
| 4,575,026 A | 3/1986 | Brittain et al. | |
| 4,680,962 A | 7/1987 | Durbin | |
| 4,753,400 A | 6/1988 | Reuter et al. | |
| 4,790,497 A | 12/1988 | Yoffe | |
| 4,842,222 A | 6/1989 | Baird | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 5,806,795 A | 9/1998 | Ortelli | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,543,780 B1 | 6/2009 | Marshall et al. | |
| 7,562,843 B2 | 7/2009 | Lipponen | |
| 7,665,691 B2 | 2/2010 | Hanzlick et al. | |
| 7,712,702 B2 | 5/2010 | McGeer et al. | |
| 7,954,758 B2 * | 6/2011 | McGeer | B64C 39/024 244/110 C |
| 8,162,256 B2 * | 4/2012 | Goossen | B64C 39/024 244/110 E |
| 8,172,177 B2 * | 5/2012 | Lovell | B63B 27/10 244/110 F |
| 8,245,968 B2 | 8/2012 | McGeer et al. | |
| 8,276,844 B2 | 10/2012 | Kariv | |
| 8,313,057 B2 | 11/2012 | Rednikov | |
| 8,348,193 B2 | 1/2013 | McGeer et al. | |
| 8,453,966 B2 | 6/2013 | McGeer et al. | |
| 8,464,981 B2 | 6/2013 | Goldie et al. | |
| 8,573,536 B2 | 11/2013 | McGeer et al. | |
| 8,596,576 B1 | 12/2013 | McGeer et al. | |
| 8,672,264 B1 | 3/2014 | McGeer et al. | |
| 8,708,277 B1 | 4/2014 | McGeer et al. | |
| 8,708,278 B2 | 4/2014 | McGeer et al. | |
| 8,714,482 B2 | 5/2014 | McGeer et al. | |
| 8,740,142 B2 | 6/2014 | McGeer et al. | |
| 8,944,373 B2 * | 2/2015 | Dickson | B64F 1/02 244/110 C |
| 8,955,800 B2 | 2/2015 | McGeer et al. | |
| 8,955,801 B2 | 2/2015 | McGeer et al. | |
| 9,004,402 B2 | 4/2015 | McGeer et al. | |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0178894 A1 | 8/2005 | McGeer et al. | |
| 2012/0223182 A1 | 9/2012 | Gilchrist et al. | |
| 2013/0082137 A1 | 4/2013 | Gundlach et al. | |
| 2013/0161447 A1 | 6/2013 | McGeer et al. | |
| 2014/0263852 A1 | 9/2014 | Walker et al. | |
| 2015/0129716 A1 | 5/2015 | Yoffe | |

FOREIGN PATENT DOCUMENTS

| | | |
|---|---|---|
| EP | 0472613 | 4/1992 |
| EP | 2 186 728 | 5/2010 |
| GB | 2071031 | 9/1981 |
| WO | WO 01/07318 | 2/2001 |
| WO | WO 2008/015663 | 2/2008 |
| WO | WO 2013/171735 | 11/2013 |

OTHER PUBLICATIONS

Aerosonde hazard estimation, T. McGeer, 1994, (7 pp).

Aerosonde Pacific reconnaissance: ready when you are!, T. McGeer, Pacific Northwest Weather Workshop, Mar. 2005, (15 pp).

An Airspeed Vector Sensor for V/STOL Aircraft, E. J. Durbin and T. McGeer, Journal of Aircraft, vol. 19 No. 6, Jun. 1982, (7 pp).

Automated Launch, Recovery, and Refueling for Small Unmanned Aerial Vehicles, K. Mullens et al., 2004 (11 pp).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp).

Quantitative Risk Management as a Regulatory Approach to Civil UAVs, T. McGeer, L. Newcombe, and J. Vagners, International Workshop on UAV Certification, Jun. 1999, (11 pp).

Regulatory Issues Involving Long-Range Weather Observation by Aerosonde Autonomous Aircraft, T. McGeer, Oct. 1998, (8 pp).

Rotary Action, description of scene of License to Kill, available at http://www.rotaryaction.com/pages/licetkil.html (2 pp).

Safety, Economy, Reliability and Regulatory Policy of Unmanned Aircraft, T. McGeer, Mar. 2007, (9 pp).

Skyhook (Harrier handling system); Harpoon Head Quarters; available at http://www.harpoondatabases.com/encyclopedia/Entry2979.aspx; printed Jun. 21, 2013 (3 pages).

(56) References Cited

OTHER PUBLICATIONS

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).

Wide-Scale Use of Long-Range Miniature Aerosondes Over the World's Oceans, T. McGeer and J. Vagners, 1999, (25 pp).
Mini-RPV Recovery System Conceptual Study, Prepared for Eustis Directorate U.S. Army Air Mobility Research and Development Laboratory, Aug. 1977 (322 pages).

* cited by examiner

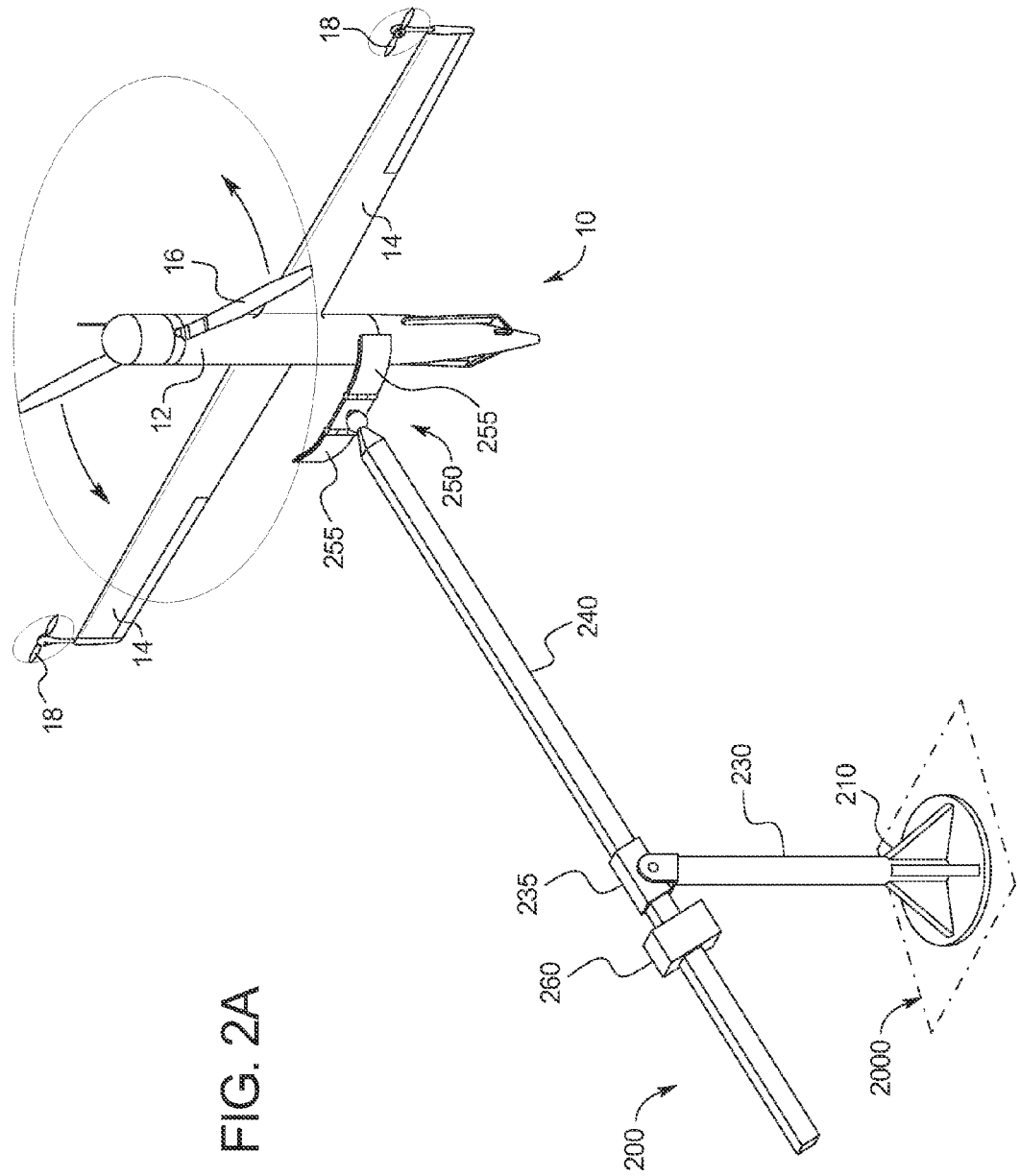

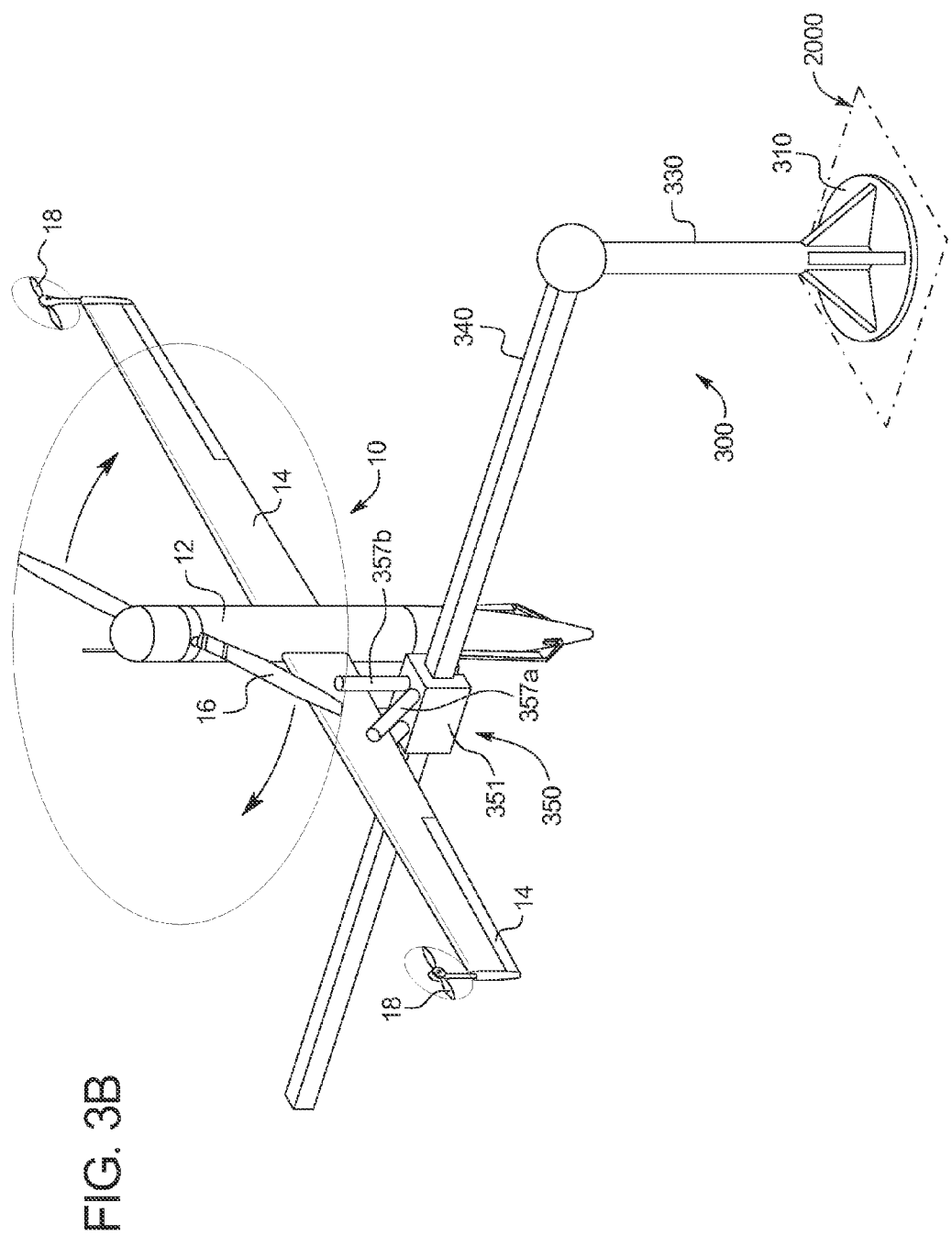

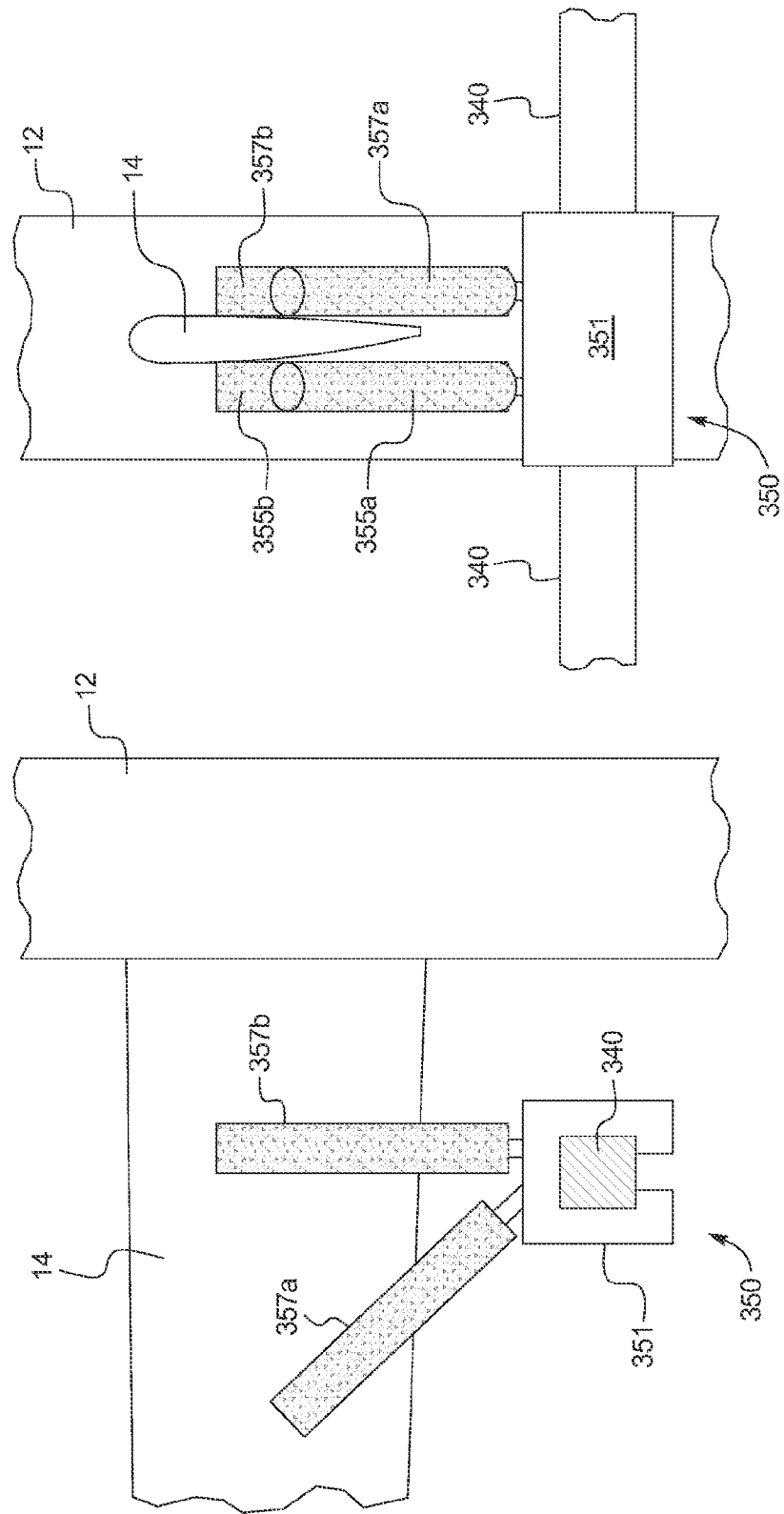

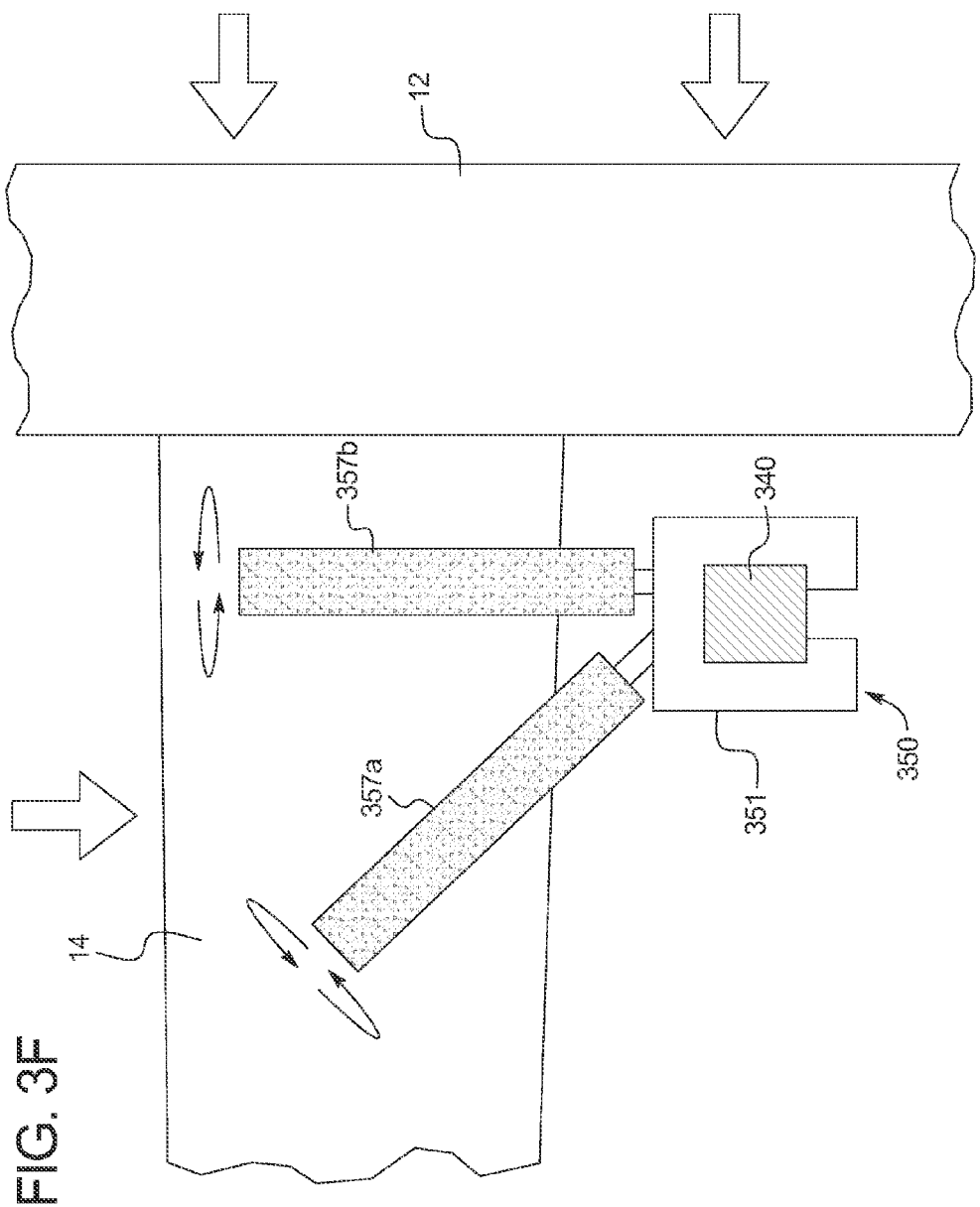

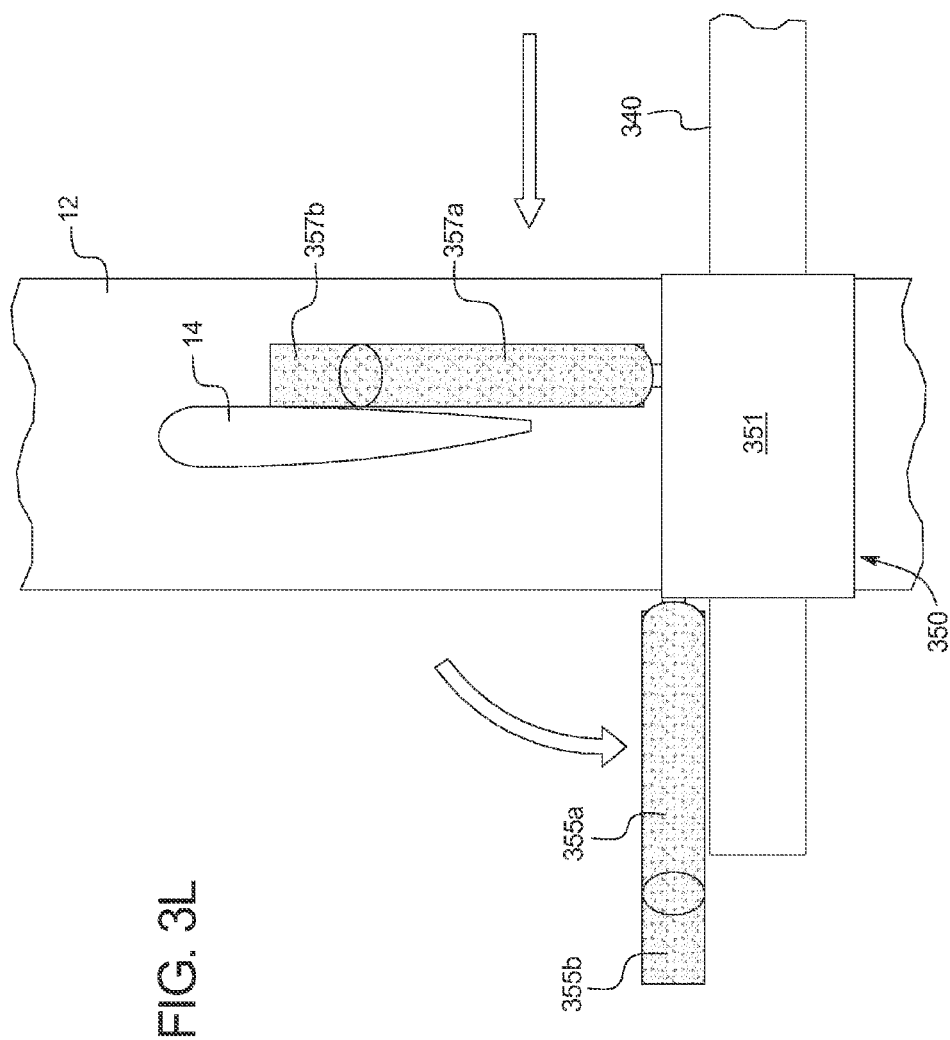

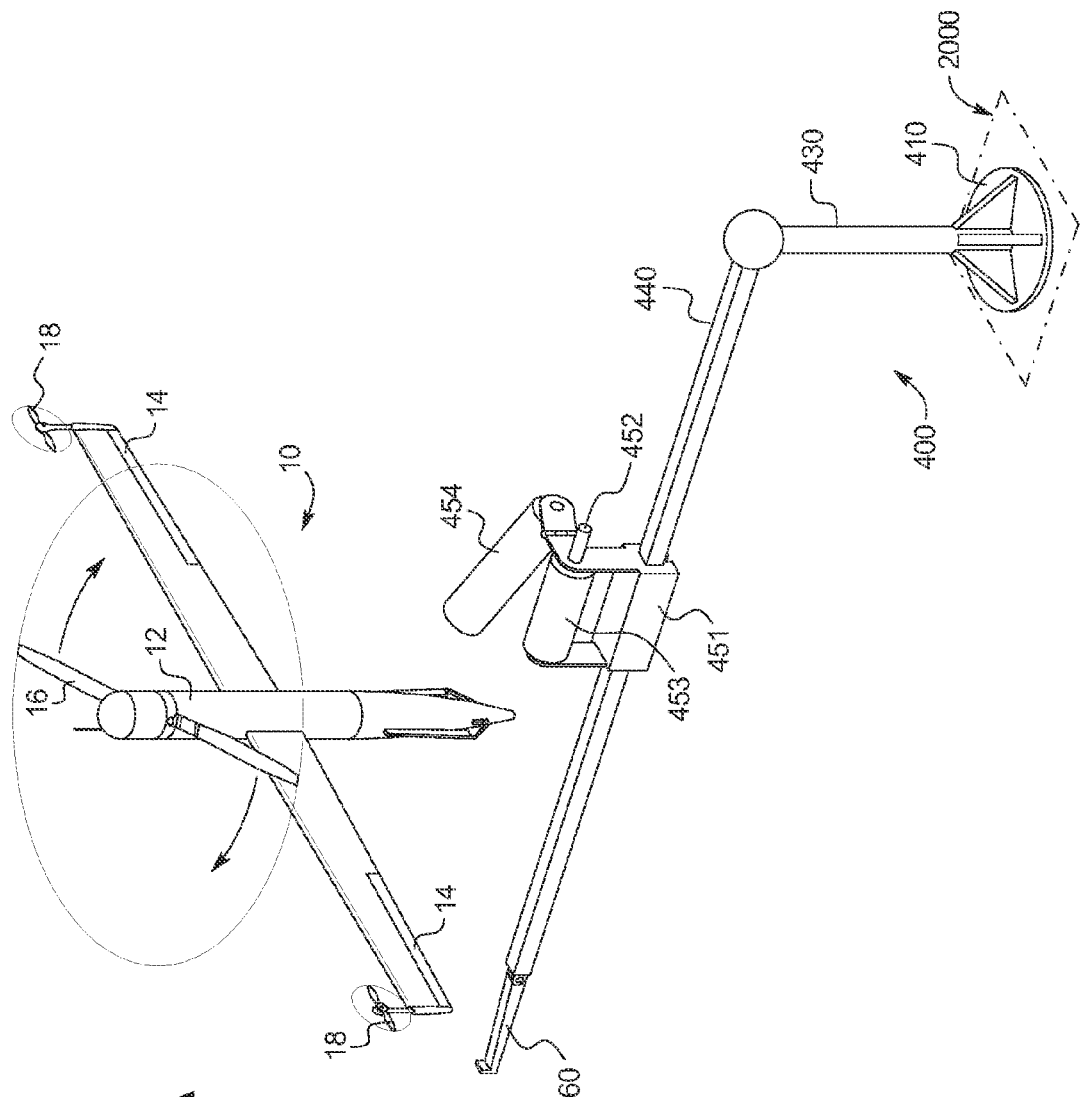

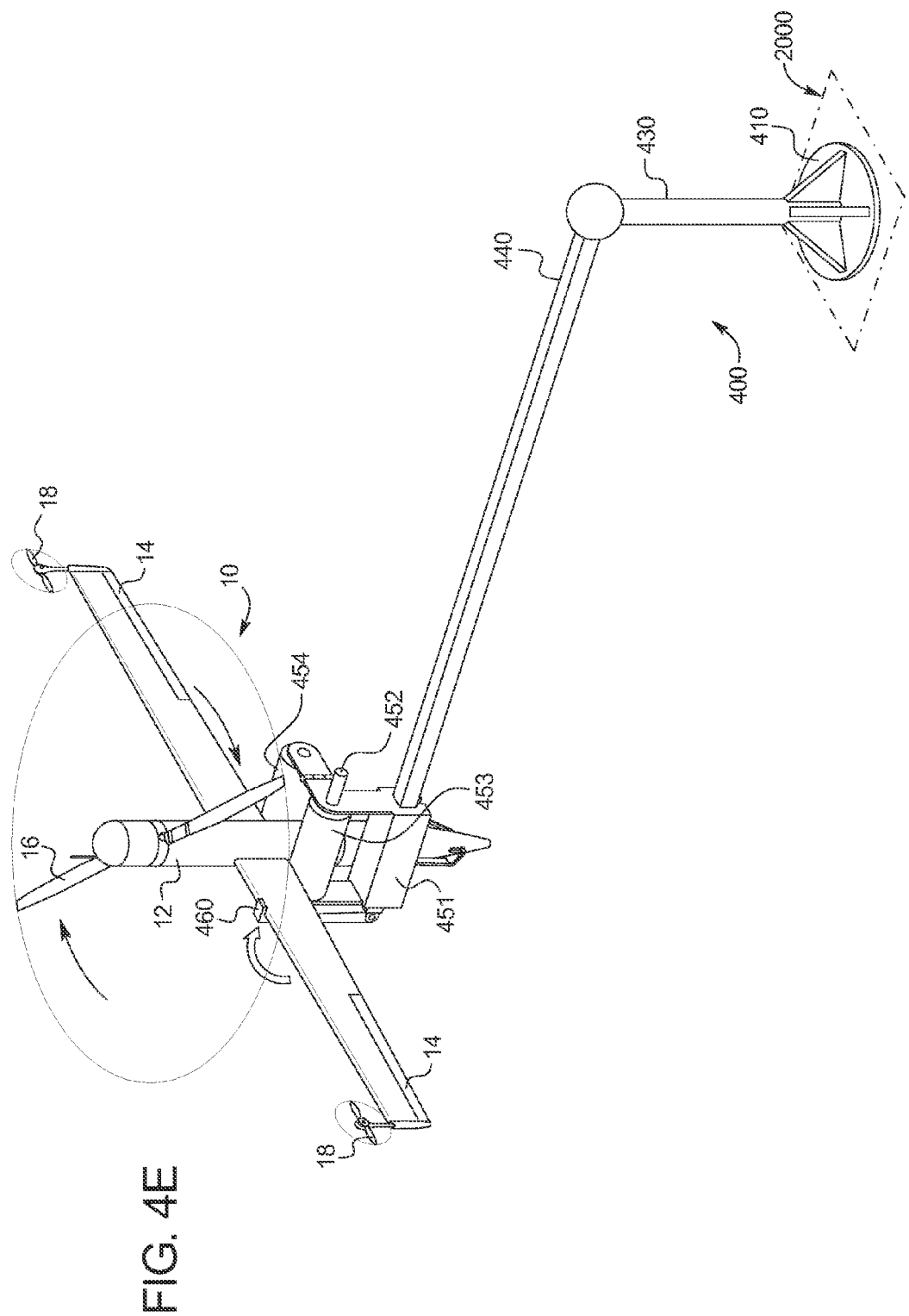

APPARATUS AND METHOD FOR LAUNCH AND RETRIEVAL OF A HOVERING AIRCRAFT

PRIORITY CLAIM

This application claims priority to and the benefit of U.S. Provisional Patent Application No. 61/881,188, filed on Sep. 23, 2013, the entire contents of which are incorporated herein by reference.

BACKGROUND

Hovering aircraft, be they helicopters, thrust-vectoring jets, "tail-sitters," or other types, usually land by gently descending in free thrust-borne flight onto a landing surface and coming to rest on an undercarriage of wheels, skids, or legs. This elementary technique can be problematic in certain conditions, such as when targeting a small, wind-swept landing pad on a ship moving in a rough sea. The well-known Beartrap or Recovery Assist, Secure, and Traverse (RAST) system and the well-known harpoon-and-grid system are used by helicopters to permit retrieval with acceptable safety in such conditions. These systems require an expensive and substantial plant in the landing area, as well as manual operations coordinated between the helicopter and the shipboard crew. Furthermore, the helicopter must carry a complete undercarriage in addition to the components necessary for capturing the retrieval apparatus, adding size and weight to the helicopter.

Thus, there is a continuing need to provide improved apparatuses and methods for capturing hovering aircraft from free thrust-borne flight including: (a) simplified base apparatuses; (b) simplified apparatuses (if any) onboard the hovering aircraft; and (c) automated operation encompassing retrieval, subsequent servicing, and launch.

SUMMARY

Various embodiments of the present disclosure provide an apparatus and method for launch and retrieval of a hovering aircraft. Generally, the apparatus of the present disclosure is configured to capture a hovering aircraft between two or more fingers of an aircraft capturer, guide the captured aircraft into a docking station for servicing and/or storage, and launch the aircraft from the docking station. The apparatus of the present disclosure is thus configured to bring the aircraft from an imprecise, irregular hover into a secure and well-controlled rest state. The tolerance of imprecision provided by the apparatus makes it particularly suited for use under a practical conditions such as aboard a small boat in a rough sea.

In various embodiments, the apparatus of the present disclosure is configured to: (a) detect movement of a hovering aircraft; (b) automatically cause the aircraft capturer to move in a manner corresponding to the detected movement of the aircraft such that the aircraft capturer follows or tracks the aircraft while maintaining a designated distance from the aircraft; (c) when tracking is satisfactory, automatically cause the aircraft capturer to capture the aircraft between two fingers quickly enough so that any motion between the point in time at which the decision is made to capture the aircraft and the capture itself is negligible; and (d) if unwanted contact threatens, quickly move away from the aircraft in order to prevent collision.

In other embodiments, the apparatus of the present disclosure is configured to cause the aircraft capturer to capture a wing of the aircraft between two jaws each including two fingers and automatically draw the captured aircraft into a desired position proximate the aircraft capturer by spinning the fingers.

In other embodiments, the apparatus of the present disclosure is configured to cause the aircraft capturer to capture a fuselage of the aircraft between two fingers and automatically draw the captured aircraft into a desired position proximate the aircraft capturer by spinning the fingers.

In various embodiments, after the aircraft capturer captures the aircraft, the apparatus automatically guides the captured aircraft into a docking station. Once secured in the docking station, the aircraft is shut down and the aircraft may be serviced. After any servicing is performed on the aircraft, the aircraft may be launched by substantially reversing the process by which the aircraft was captured.

Additional features and advantages are described herein, and will be apparent from, the following Detailed Description and the Figures.

BRIEF DESCRIPTION OF THE FIGURES

FIG. 2A illustrates an aircraft stationkeeping in the vicinity of another example embodiment of the apparatus of the present disclosure.

FIGS. 3B, 3C, and 3D illustrate the apparatus of FIG. 3A after capturing a wing of the aircraft.

FIGS. 3E and 3F illustrate the fingers of aircraft capturer of the apparatus of FIG. 3A spinning to cause the aircraft to move into a desired position with respect to the aircraft capturer.

FIG. 3I illustrates the apparatus of FIG. 3A sliding the aircraft capturer toward the distal end of the upper arm in preparation for docking.

FIGS. 3K and 3L illustrate the apparatus of FIG. 3A releasing the wing of the aircraft and pushing the aircraft into free thrust-borne flight.

FIG. 4A illustrates an aircraft stationkeeping in the vicinity of another example embodiment of the apparatus of the present disclosure.

FIG. 4E illustrates the aircraft in the desired position with respect to the aircraft capturer and the wing restraint pivoted into place.

DETAILED DESCRIPTION

Figure 1A:
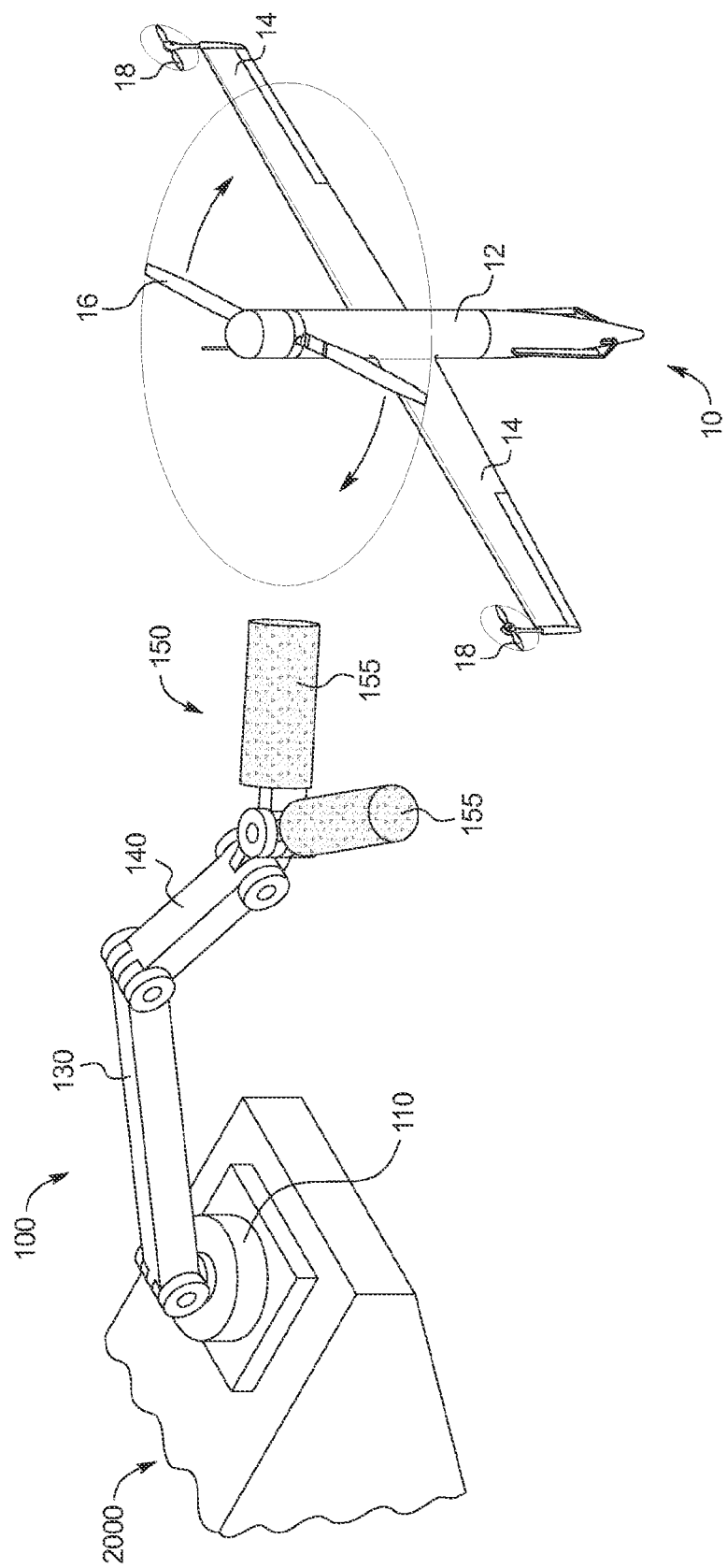
FIG. 1A illustrates an aircraft stationkeeping in the vicinity of an example embodiment of the apparatus of the present disclosure.

Various example embodiments of the apparatus of the present disclosure are described below.

First Example Embodiment

In this example embodiment, the apparatus of the present disclosure is configured to: (a) detect movement of a hovering aircraft; (b) automatically cause the aircraft capturer to move in a manner corresponding to the detected movement of the aircraft such that the aircraft capturer follows or tracks the aircraft while maintaining a designated distance from the aircraft; (c) when tracking is satisfactory and the movement of the aircraft is stabilized, automatically cause the aircraft capturer to capture the aircraft between two fingers quickly enough so that any motion between the point in time at which the decision is made to capture the aircraft and the capture itself is negligible; and (d) if unwanted contact threatens, quickly move away from the aircraft in order to prevent collision.

Turning to the Figures, FIGS. 1A to 1H illustrate this example embodiment of the apparatus, which is generally indicated by numeral 100 and includes: (a) a rotatable base 110 anchored or otherwise attached to a surface 2000 (such as the deck of a ship at sea) such that the base 110 is configured to rotate relative to the surface 2000 about a substantially vertical axis through a center of the base 110; (b) a lower or first arm 130 pivotably connected at a first end to the base 110 via a revolute joint such that the lower arm 130 is configured to pivot about a substantially horizontal axis through the connection to the base 110; (c) an upper or second arm 140 pivotably connected at a first end to a second end of the lower arm 130 via a revolute joint such that the upper arm 140 is configured to pivot about a substantially horizontal axis through the connection to the lower arm 130; and (d) an aircraft capturer 150 pivotably connected to a second end of the upper arm 140 via a revolute joint such that the aircraft capturer 150 is configured to pivot about a substantially horizontal axis through the connection to the upper arm 140.

Figure 1B:
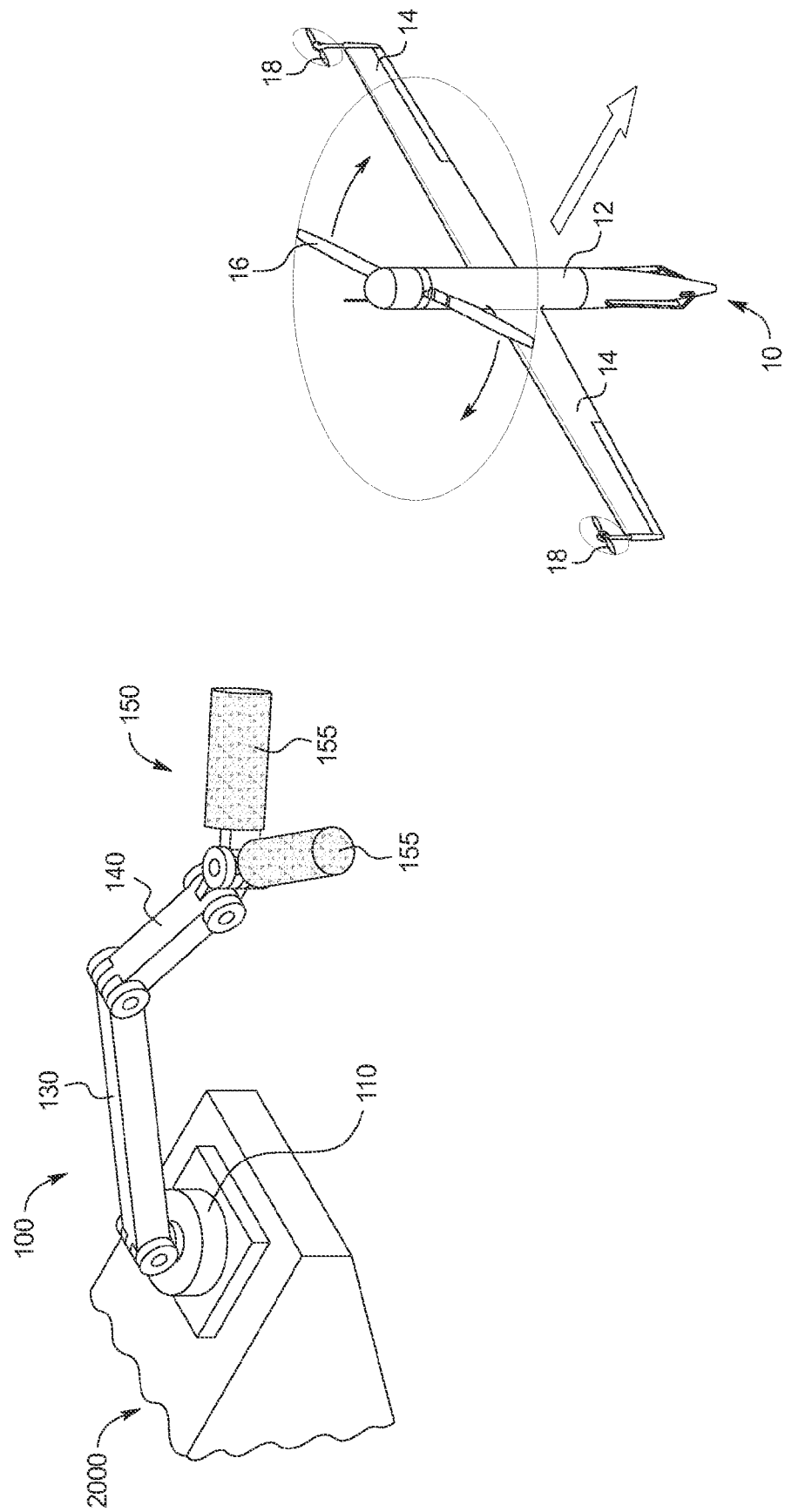
FIG. 1B illustrates the aircraft moving radially away from an aircraft capturer of the apparatus of FIG. 1A along a substantially horizontal plane.
Figure 1C:
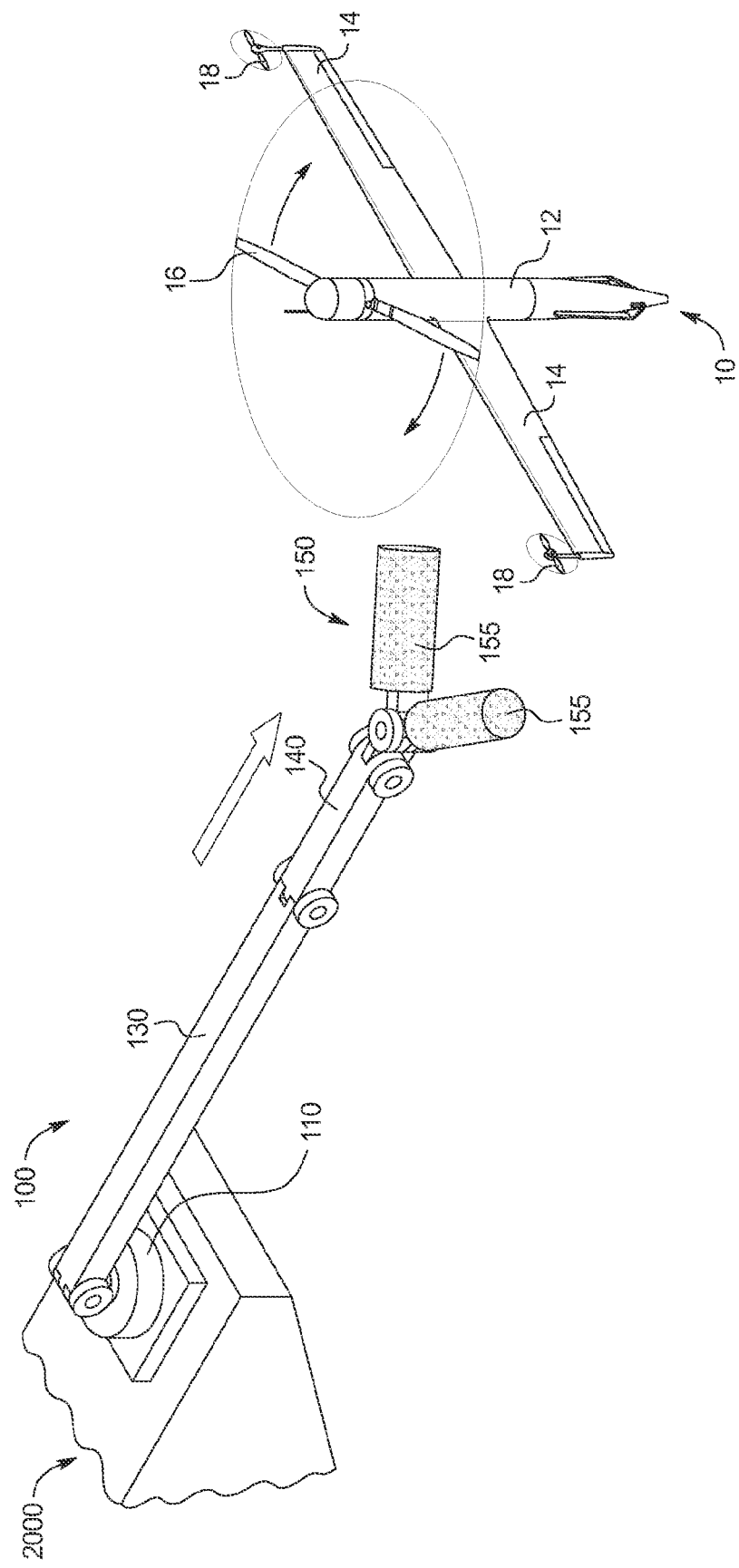
FIG. 1C illustrates the apparatus of FIG. 1A detecting the aircraft's movement and automatically causing the aircraft capturer to move radially outward to follow the aircraft.
Figure 1D:
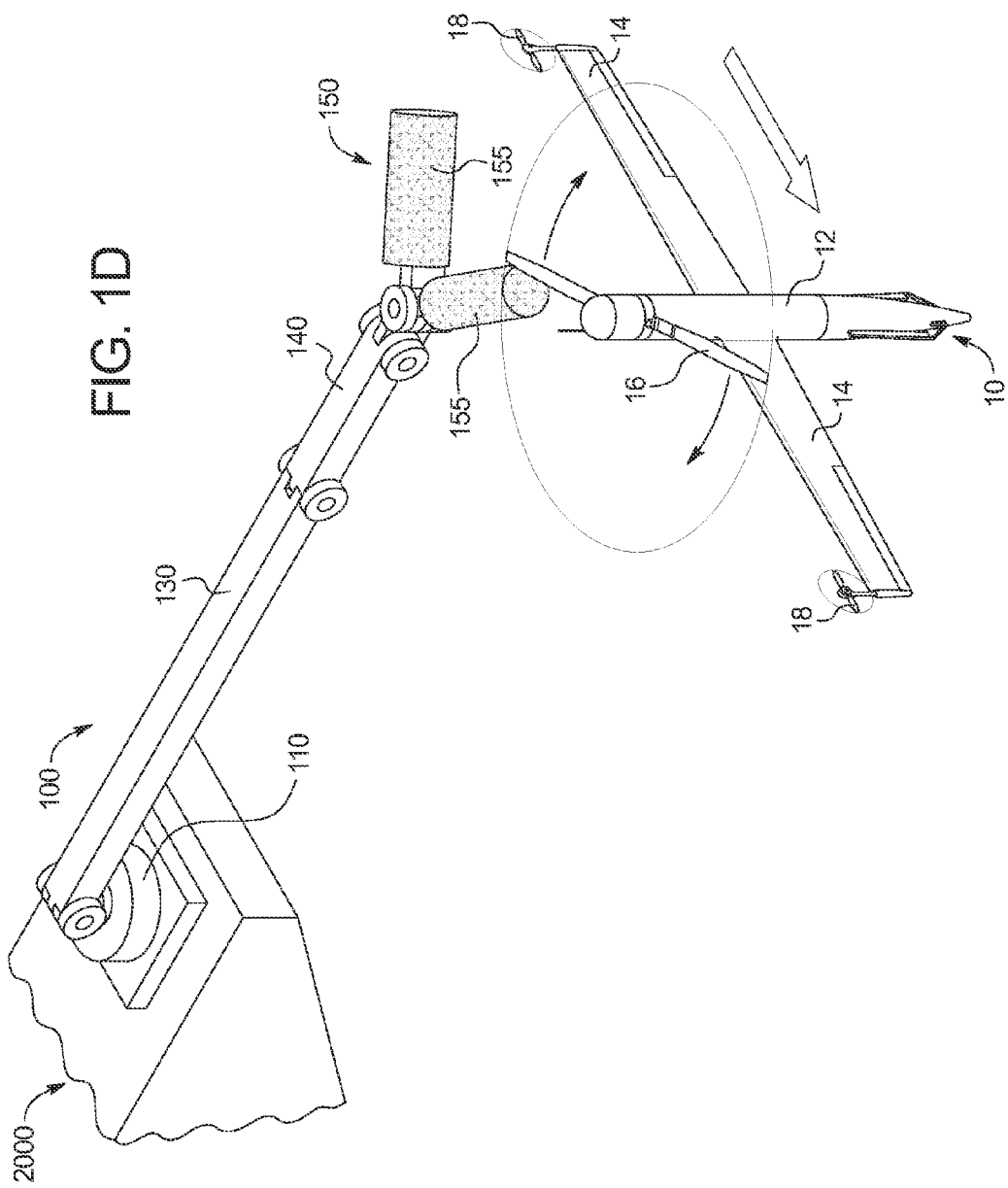
FIG. 1D illustrates the aircraft moving azimuthally to the right of the aircraft capturer of the apparatus of FIG. 1A.
Figure 1E:
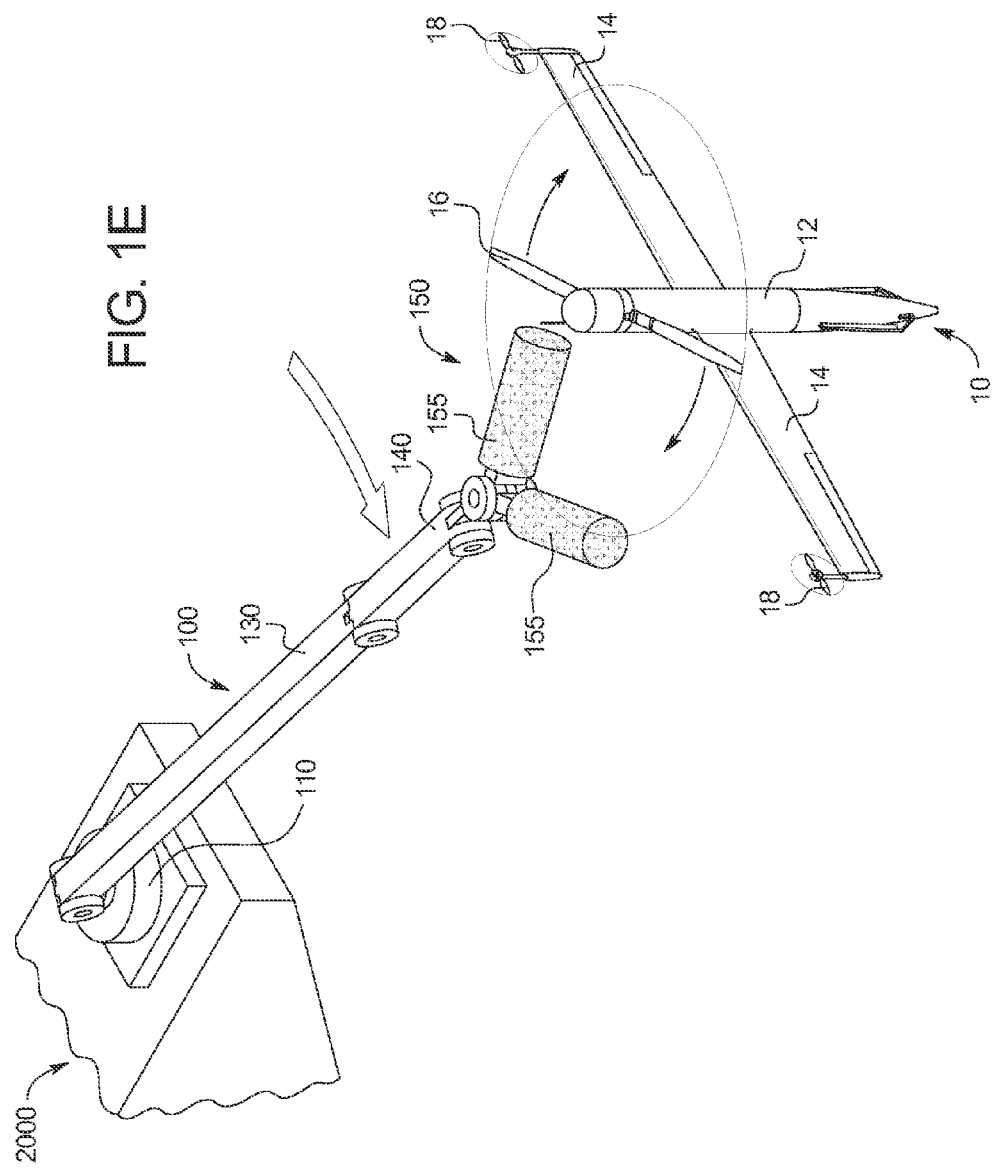
FIG. 1E illustrates the apparatus of FIG. 1A detecting the aircraft's movement and automatically causing the aircraft capturer to move azimuthally to the right to follow the aircraft.
Figure 1F:
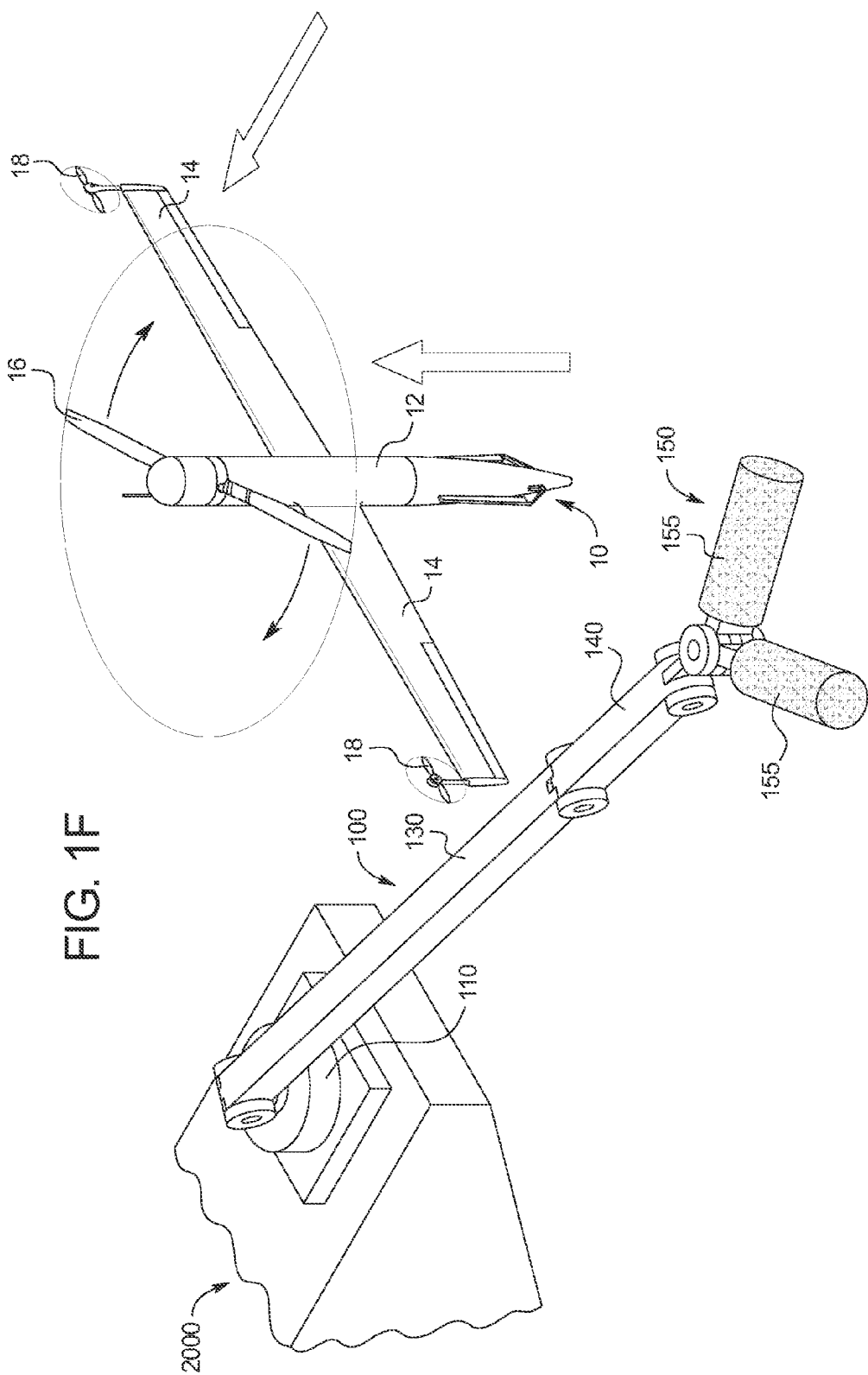
FIG. 1F illustrates the aircraft increasing its altitude and moving radially toward the aircraft capturer of the apparatus of FIG. 1A.
Figure 1G:
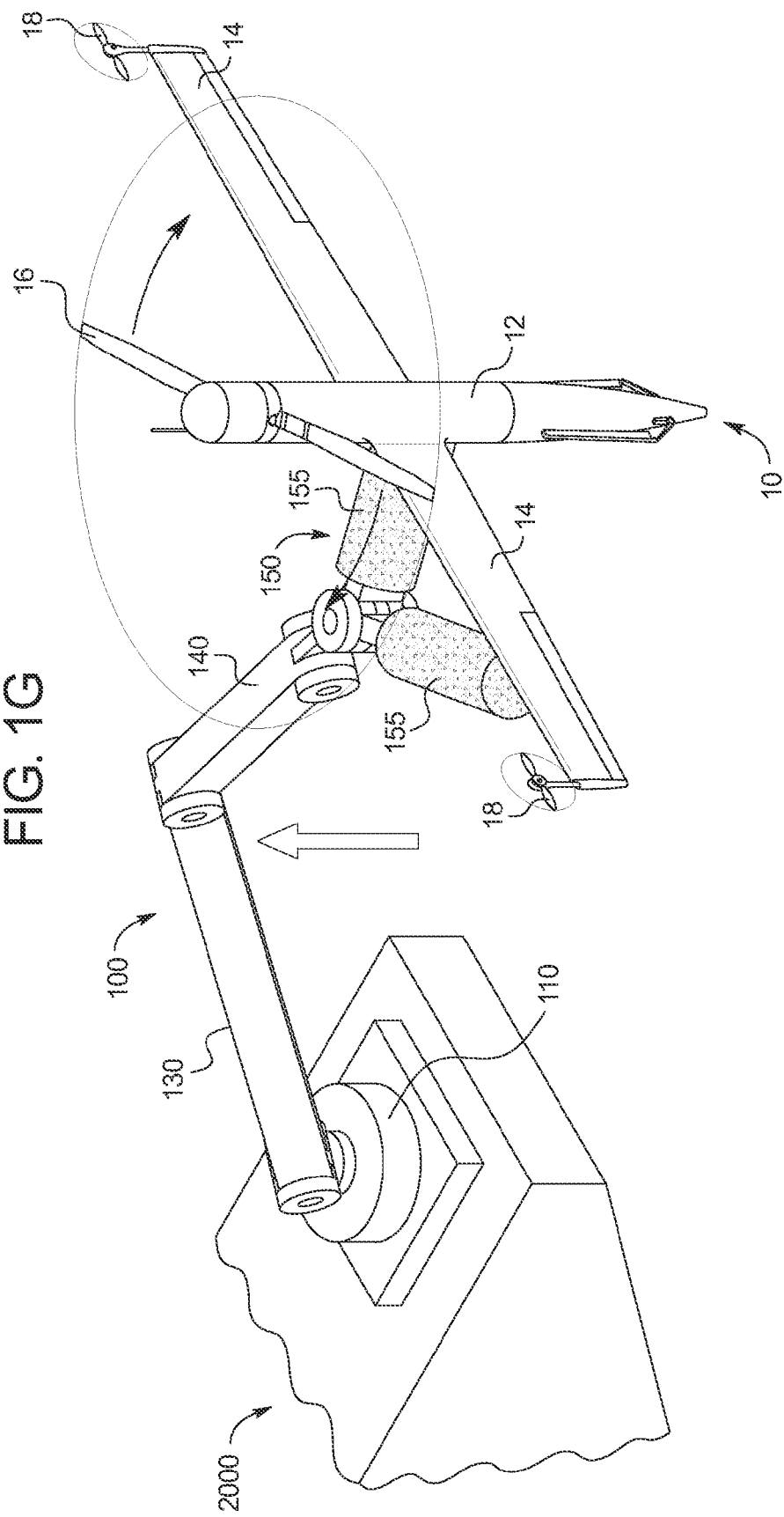
FIG. 1G illustrates the apparatus of FIG. 1A detecting the aircraft's movement and automatically causing the aircraft capturer to increase its altitude and move radially inward to follow the aircraft.
Figure 1H:
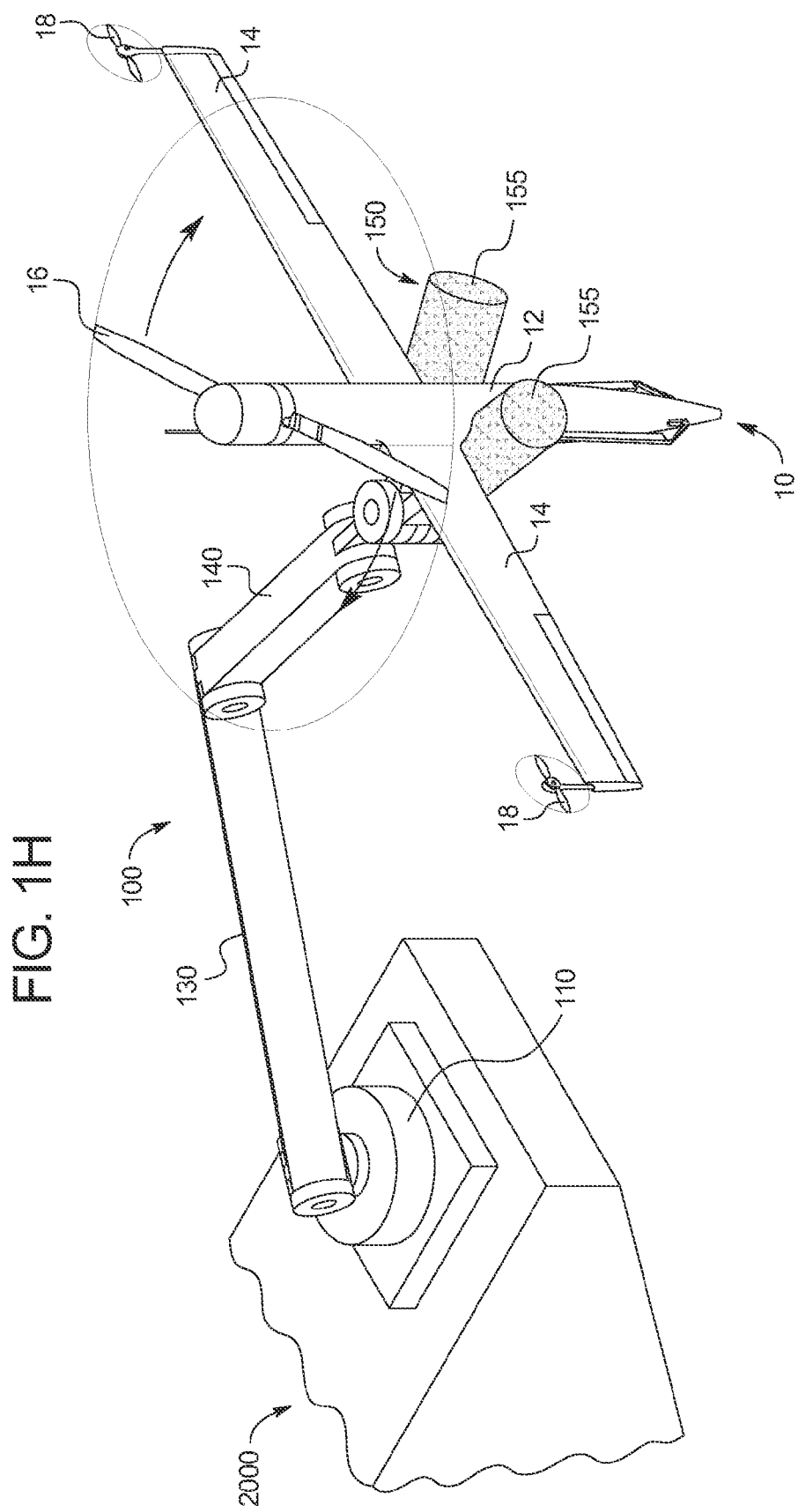
FIG. 1H illustrates the apparatus of FIG. 1A after capturing the aircraft.

The aircraft capturer 150 includes two fingers 155 having an open configuration (as shown in FIGS. 1A to 1G) and a closed configuration (as shown in FIG. 1H). In this example embodiment, the fingers 155 each include: (a) a generally solid support; (b) a cushioned material (such as foam) at least partially surrounding the support and configured to partially conform to the fuselage of the aircraft 10 when the fingers 155 capture the aircraft 10 (as shown in FIG. 1H); and (c) a protective layer or coating of high-friction material such as friction tape, suction cups, or soft rubber substantially covering an outer surface of the cushioned material. In other embodiments (such as the second example embodiment described below), the fingers do not include the cushioned material or the layer of high-friction material. In certain embodiments (such as the second example embodiment described below), the fingers are curved or contoured in the shape of the fuselage of the aircraft. In further embodiments, the fingers include a plurality of components connected by revolute joints such that multiple components of the fingers may pivot relative to one another. In various embodiments, the fingers are magnetic or include electromagnets that facilitate capture of the aircraft by attracting one or more magnetic components of the aircraft.

Although not shown, the apparatus 100 includes a controller configured to control movement of: (a) the base 110, (b) the lower arm 130, (c) the upper arm 140, and (d) the aircraft capturer 150 (including the fingers 155).

In this example embodiment, the aircraft 10 includes a generally cylindrical fuselage 12 including a nose end and a tail end, a main rotor 16 near the nose end of the fuselage 12, and a plurality of opposing wings 14 each connected to and extending transversely from the fuselage 12 at a first end and including a thruster 18 at a second end opposite the first end. The main rotor 16 is configured to control pitch and yaw with rotor cyclic (similar to a conventional helicopter), while the thrusters 18 facilitate control in roll (i.e., control about the spin axis of the main rotor 16). It should be appreciated that the aircraft is one example aircraft, and that the apparatus of the present disclosure may be employed to capture any suitable aircraft.

In this example embodiment, the apparatus 100 is configured to measure a variety of different parameters or properties of the aircraft 10 to facilitate capture. Here, the apparatus measures: (a) the altitude of the aircraft 10 (such as relative to the aircraft capturer 150, the base 110, or any other suitable point); (b) the azimuthal position of the aircraft 10 (relative to any suitable point); (c) the radial position of the aircraft 10 (relative to any suitable point); (d) the global position of the aircraft 10; (e) the components of the velocity of the aircraft 10; (f) the components of the velocity of the aircraft 10 relative to any suitable point (such as the surface 2000, which may be moving); and (g) the attitude (e.g., the pitch, roll, and yaw) of the aircraft 10. It should be appreciated that the apparatus may measure any suitable parameters or properties of the aircraft 10. It should also be appreciated that the apparatus 100 does so in any suitable manner, such as via one or more sensors (such as optical sensors), a real time kinematic global positioning system, and/or any other suitable measuring devices on one or more components of the apparatus 100 or the aircraft 10.

As illustrated in FIG. 1A, in preparation for capture, the aircraft 10 stationkeeps spanwise-to-wind relative to the surface 2000 (such as at a radial distance from the surface 2000 approximately equal to a diameter of the main rotor 16) such that the aircraft 10 is near the apparatus 100. Stationkeeping will normally be imperfect due to, for example, gusty, unpredictable winds and rough seas. As the aircraft 10 moves relative to the aircraft capturer 150, the apparatus 100 monitors the position of the aircraft 10 relative to the aircraft capturer 150. The apparatus 100 (and, more specifically, the controller) automatically manipulates the base 110, the lower arm 130, and/or the upper arm 140 to cause the aircraft capturer 150 to move in a manner corresponding to the movement of the aircraft such that the aircraft capturer 150 follows or tracks the movement of the aircraft 10 while maintaining a designated radial distance from the aircraft 10, as shown in FIGS. 1B to 1G.

More specifically, as shown in FIG. 1B, the aircraft 10 moves radially away from the aircraft capturer 150 along a substantially horizontal plane, and as shown in FIG. 1C, the apparatus 100 detects this movement of the aircraft 10 and automatically causes the aircraft capturer 150 to move radially outward along a substantially horizontal plane (i.e., in a manner corresponding to the detected movement of the aircraft 10) to follow or track the aircraft 10. As shown in FIG. 1D, the aircraft 10 moves azimuthally to the right of the aircraft capturer 150 along a substantially horizontal plane, and as shown in FIG. 1E, the apparatus 100 detects this movement of the aircraft 10 and automatically causes the aircraft capturer 150 to move azimuthally to the right along a substantially horizontal plane (i.e., in a manner corresponding to the detected movement of the aircraft 10) to follow or track the aircraft 10. As shown in FIG. 1F, the aircraft 10 increases its altitude and moves radially toward the aircraft capturer 150 along a substantially horizontal plane, and as shown in FIG. 1G, the apparatus 100 detects this movement of the aircraft 10 and automatically causes the aircraft capturer 150 to increase its altitude and move radially backward along a substantially horizontal plane (i.e., in a manner corresponding to the detected movement of the aircraft 10) to follow or track the aircraft 10.

As shown in FIG. 1H, when tracking is satisfactory and the movement of the aircraft is stabilized (such as when: (i) the altitude, azimuthal position, and radial position of the aircraft 10 are within designated ranges; (ii) the velocity components of the aircraft 10 are within designated ranges; and (iii) the components of the attitude of the aircraft 10 are within designated ranges), the apparatus 100 automatically: (a) moves the aircraft capturer 150 towards the aircraft 10 such that a portion of the fuselage 12 of the aircraft 10 aft of the wings 14 and near the center of mass of the aircraft 10 is positioned between the fingers 155; and (b) manipulates the fingers 155 into the closed configuration such the fingers 155 capture the fuselage 12 (and, therefore, the aircraft 10) therebetween. It should be appreciated that, in this example embodiment, the fingers 155 capture the fuselage aft of the wings 14 and near the center of mass of the aircraft 10. It should be appreciated that capturing the aircraft 10 near its center of mass (as opposed to near the tail of the aircraft 10) prevents the apparatus 100 from imposing unrecoverable pitch and yaw loads, which enables the aircraft 10 to continue to exercise effective attitude and altitude control (explained below).

It should be appreciated that after the apparatus determines that tracking is satisfactory, the apparatus captures the hovering aircraft quickly enough so that any motion between the point in time at which the decision is made to capture the hovering aircraft and capture itself is negligible.

In this example embodiment, once the aircraft capturer 150 captures the aircraft 10, the apparatus 100 constrains the azimuthal and radial components of the movement of the aircraft 10, while the main rotor 16 of the aircraft 10 continues to spin to support the weight of the aircraft 10 and to enable the aircraft 10 to continue regulating the attitude and altitude of the aircraft 10. The fingers 155 hold the aircraft 10 with enough force to prevent the aircraft 10 from pulling free. Since the apparatus 100 need not support the weight of the aircraft 10 after capture in this example embodiment, the size and cost of the apparatus 100 may be minimized.

While the above-described Figures illustrate a lag between the movement of the aircraft and the corresponding following or tracking movement of the aircraft capturer, it should be appreciated that, in operation, the combination of the large amount of measured information regarding the aircraft's movement and position and the relatively light weight of the apparatus provides the apparatus with high bandwidth such that it is configured to cause the aircraft capturer to follow the aircraft with negligible lag and, in certain embodiments, to centimeter accuracy.

It should be appreciated that the designated radial distance from the aircraft that the apparatus maintains while tracking the aircraft is large enough to ensure that the aircraft will not unintentionally collide with the aircraft capturer (e.g., is a safe distance from the aircraft). That is, in addition to automatically causing the aircraft capturer to track or follow the movement of the aircraft, the apparatus is configured to automatically cause the aircraft capturer (and the other components of the apparatus) to evade the aircraft should collision threaten. For instance, the aircraft capturer and the aircraft are maintained the designated radial distance apart such that if strong wind unexpectedly blows the aircraft toward the aircraft capturer, the apparatus can quickly detect this unexpected and potentially hazardous movement and cause the aircraft capturer to evade the movement of the aircraft.

In certain embodiments, after the aircraft capturer captures the aircraft, the apparatus automatically guides the captured aircraft into a docking station (not shown). Once secured in the docking station, the aircraft is shut down, the main rotor is stopped, and the aircraft may be serviced. After any servicing is performed on the aircraft 10, the apparatus 100 may launch the aircraft 10 by substantially reversing the above-described process. More specifically, to launch the aircraft 10: (a) the aircraft 10 re-starts its engine (such as by using an internal starter or a starter incorporated into the docking station); (b) the apparatus 100 automatically re-captures the aircraft 10; (c) the aircraft pulls itself out of the docking station and stationkeeps near the surface 2000; and (d) when the aircraft 10 is sufficiently clear of any obstacles and is determined to be stationkeeping properly (e.g., no sag is detected in the upper arm 140), the apparatus 100 releases the aircraft 10 into free thrust-borne flight while quickly maneuvering away from the aircraft 10.

It should be appreciated that, in other embodiments, the base is: (a) non-rotatable, or (b) configured to move in one or more manners instead of or in addition to rotation, such as swiveling or pivoting about a substantially horizontal axis. In another embodiment, the aircraft capturer is configured to rotate about a substantially horizontal axis to enable the aircraft capturer to account for the aircraft having a non-vertical orientation.

Second Example Embodiment

Figure 2B:
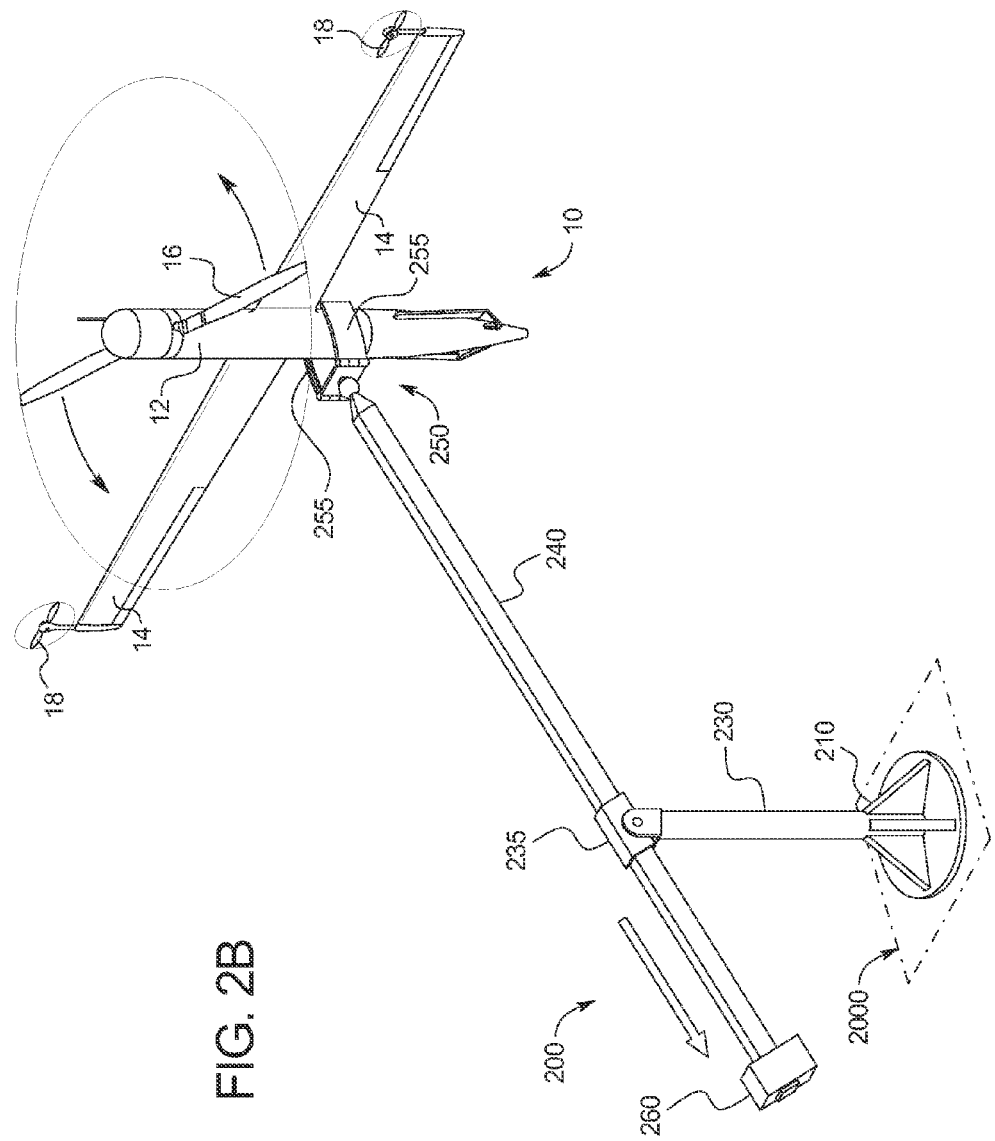
FIG. 2B illustrates the apparatus of FIG. 2A after capturing the aircraft.
Figure 2C:
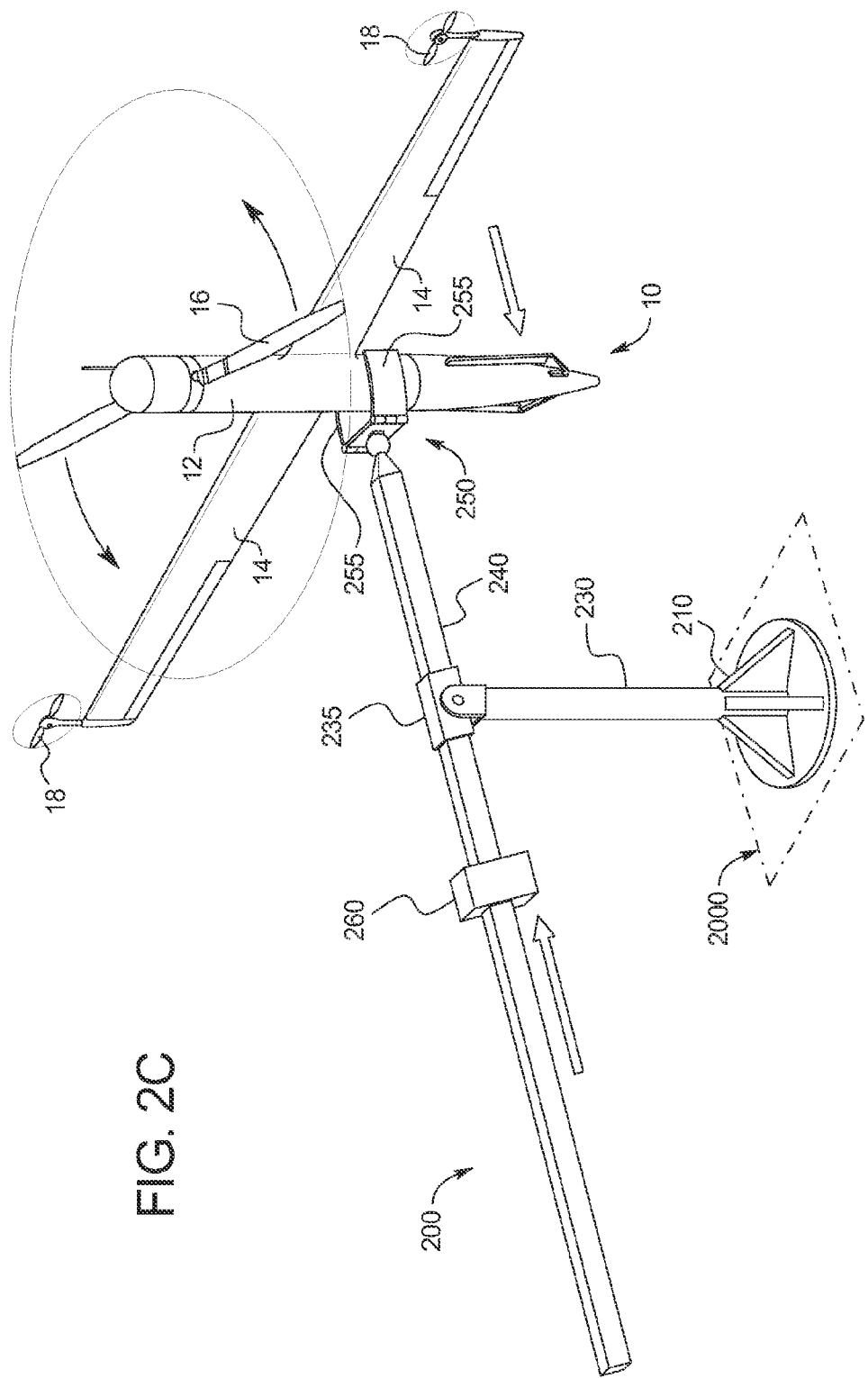
FIG. 2C illustrates the apparatus of FIG. 2A transporting the captured aircraft toward the base of the apparatus.
Figure 2D:
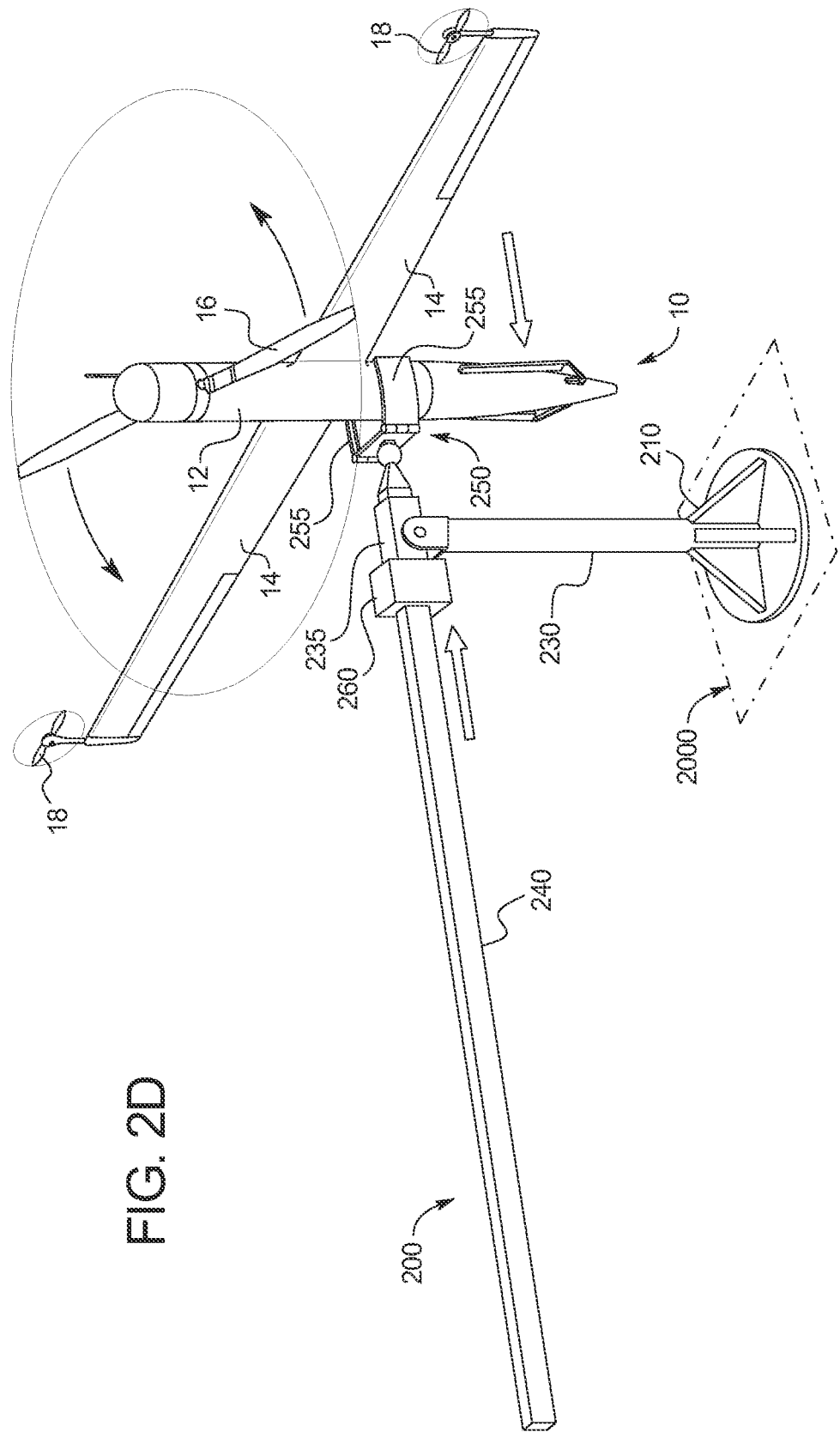
FIG. 2D illustrates the apparatus of FIG. 2A after transporting the captured aircraft to the base.

FIGS. 2A to 2D illustrate a second example embodiment of the apparatus of the present disclosure, which is generally indicated by numeral 200 and includes: (a) a base 210 anchored or otherwise attached to the surface 2000; (b) a substantially vertical lower or first arm 230 extending from the base 210; (c) a sleeve or upper arm supporter 235 rotatably and pivotably connected to an upper end of the first arm 230 such that the sleeve 235 is configured to: (i) rotate relative to the first arm 230 about a substantially vertical axis through the center of the first arm 230, and (ii) pivot about a substantially horizontal axis through the connection to the first arm 230; (d) an upper or second arm 240 mounted within the sleeve 235 such that the upper arm 240 is configured to move axially through the sleeve; (e) an aircraft capturer 250 connected to a first end of the upper arm 240 via a ball-and-socket joint; and (f) a counterweight 260 mounted to the upper arm 240 between a second end of the upper arm 240 and the sleeve 235 such that the counterweight 260 is configured to move axially along the upper arm 240. The aircraft capturer 250 includes two fingers 255 contoured to the shape of the fuselage of the aircraft and having an open configuration (as shown in FIG. 2A) and a closed configuration (as shown in FIGS. 2B to 2D).

Although not shown, the apparatus 200 includes a controller configured to control movement of: (a) the sleeve 235, (b) the upper arm 240, (c) the counterweight 260, and (d) the aircraft capturer 250 (including the fingers 255).

In this example embodiment, the aircraft retrieval apparatus 200 is configured to measure any suitable parameters or properties of the aircraft 10 (as described above). As illustrated in FIG. 2A, in preparation for capture, the aircraft 10 stationkeeps spanwise-to-wind relative to the surface 2000 (as described above) such that the aircraft 10 is near the apparatus 200. As the aircraft 10 moves relative to the aircraft capturer 250, the apparatus 200 monitors the position of the aircraft 10 relative to the aircraft capturer 250 to detect the movement of the aircraft 10 relative to the aircraft capturer 250 (as described above). The aircraft retrieval apparatus 200 (and, more specifically, the controller) automatically manipulates the sleeve 234, the upper arm 240, and the counterweight 260 to cause the aircraft capturer 250 to move in a manner corresponding to the movement of the aircraft such that the aircraft capturer 250 follows or tracks the movement of the aircraft 10 while maintaining a designated radial distance from the aircraft 10 (described above).

As shown in FIG. 2B, when tracking is satisfactory and the movement of the aircraft is stabilized (as described above), the apparatus 200 automatically: (a) moves the aircraft capturer 250 such that a portion of the fuselage 12 of the aircraft 10 aft of the wings 14 and near the center of mass of the aircraft 10 is positioned between the fingers 255 by axially moving or extending the upper arm 240 through the sleeve toward the aircraft 10 and axially moving the counterweight 260 along the upper arm 240 in the opposite direction (to counter-balance the extending arm); and (b) manipulates the fingers 255 into the closed configuration such the fingers 255 capture the fuselage 12 (and, therefore, the aircraft 10) therebetween.

It should be appreciated that the fingers 255 capture the fuselage aft of the wings 14 and near the center of mass of the aircraft 10 (as described above). It should also be appreciated that after the apparatus determines that tracking is satisfactory, the apparatus captures the hovering aircraft quickly enough so that any motion between the point in time at which the decision is made to capture the hovering aircraft and capture itself is negligible (as described above).

In this example embodiment, once the aircraft capturer 250 captures the aircraft 10, the apparatus 200 constrains the azimuthal and radial components of the movement of the aircraft 10, while the main rotor 16 of the aircraft 10 continues to spin to support the weight of the aircraft 10 and to enable the aircraft 10 to continue regulating the attitude and altitude of the aircraft 10. The fingers 255 hold the aircraft 10 with enough force to prevent the aircraft 10 from pulling free.

In this example embodiment, after the aircraft capturer 250 captures the aircraft, the apparatus 200 automatically guides the aircraft into a docking station (not shown). As illustrated in FIGS. 2C and 2D, after capturing the aircraft 10, the apparatus begins drawing the captured aircraft 10 toward the base 210 by axially moving or retracting the upper arm 240 through the sleeve 235 such that the captured aircraft 10 approaches the base 210 and axially moving the counterweight 260 along the upper arm 240 toward the sleeve 235 (to counter-balance the retracting arm). Once the aircraft 10 reaches the base 210, the apparatus 200 guides the aircraft 10 into the docking station (not shown), the aircraft is shut down, and the main rotor is stopped.

After any servicing is performed on the aircraft 10, the apparatus 200 launches the aircraft 10 by substantially reversing the above-described process. More specifically, to launch the aircraft 10: (a) the aircraft 10 re-starts its engine (as described above); (b) the apparatus 200 automatically re-captures the aircraft 10; (c) the aircraft pulls itself out of the docking station and stationkeeps near the surface 2000; and (d) when the aircraft 10 is sufficiently clear of any obstacles and is determined to be stationkeeping properly (e.g., no sag is detected in the upper arm 240), the apparatus 200 releases the aircraft 10 into free thrust-borne flight while quickly maneuvering away from the aircraft 10.

It should be appreciated that any suitable mechanisms may be employed to: (a) rotate and pivot the sleeve, (b) axially move the upper arm through the sleeve, (c) axially move the counterweight along the upper arm, and (d) manipulate the fingers into the open and closed configurations. It should also be appreciated that, in certain embodiments, the counterweight need not be employed. It should further be appreciated that, in other embodiments, the base or the lower arm is rotatable instead of (or in addition to) the sleeve.

Third Example Embodiment

In this example embodiment, the apparatus of the present disclosure is configured to cause the aircraft capturer to capture a wing of the aircraft between two jaws each including two fingers and automatically draw the captured aircraft into a desired position proximate the aircraft capturer by spinning the fingers.

FIGS. 3A to 3L illustrate this example embodiment of the apparatus, which is generally indicated by numeral 300 and includes: (a) a base 310 anchored or otherwise attached to the surface 2000; (b) a substantially vertical lower or first arm 330 extending from the base 310; (c) an upper or second arm 340 rotatably connected to an upper end of the lower arm 330 such that upper arm 340 is: (i) substantially perpendicular to the lower arm 330, and (ii) configured to rotate relative to the lower arm 330 about a substantially vertical axis through the center of the lower arm 330; and (d) an aircraft capturer 350 mounted to the upper arm 340 such that the aircraft capturer is configured to move axially along the upper arm 340.

The aircraft capturer 350 includes a carriage 351 that is configured to move axially along the upper arm 340. The carriage includes two spaced-apart jaws 354 and 356. The jaw 354 includes two fingers 355a and 355b that each extend from substantially the same origin on the carriage 351. As best shown in FIGS. 3C and 3D: (a) the axes through the lengths of the fingers 355a and 355b are substantially coplanar, (b) the axis through the length of the finger 355b is substantially parallel to a vertical plane along the axis through the length of the upper arm 340, and (c) the axis through the length of the finger 355a is angled about forty-five degrees from the vertical plane along the axis through the length of the upper arm 340 (though it should be appreciated that any suitable angle may be employed). Similarly, the jaw 356 includes two fingers 357a and 357b that each extend from substantially the same origin on the carriage 351. As best shown in FIGS. 3C and 3D: (a) the axes through the lengths of the fingers 357a and 357b are substantially coplanar, (b) the axis through the length of the finger 357b is substantially parallel to the vertical plane along the axis through the length of the upper arm 340, and (c) the axis through the length of the finger 357a is angled about forty-five degrees from the vertical plane along the axis through the length of the upper arm 340 (though it should be appreciated that any suitable angle may be employed).

Figure 3A:
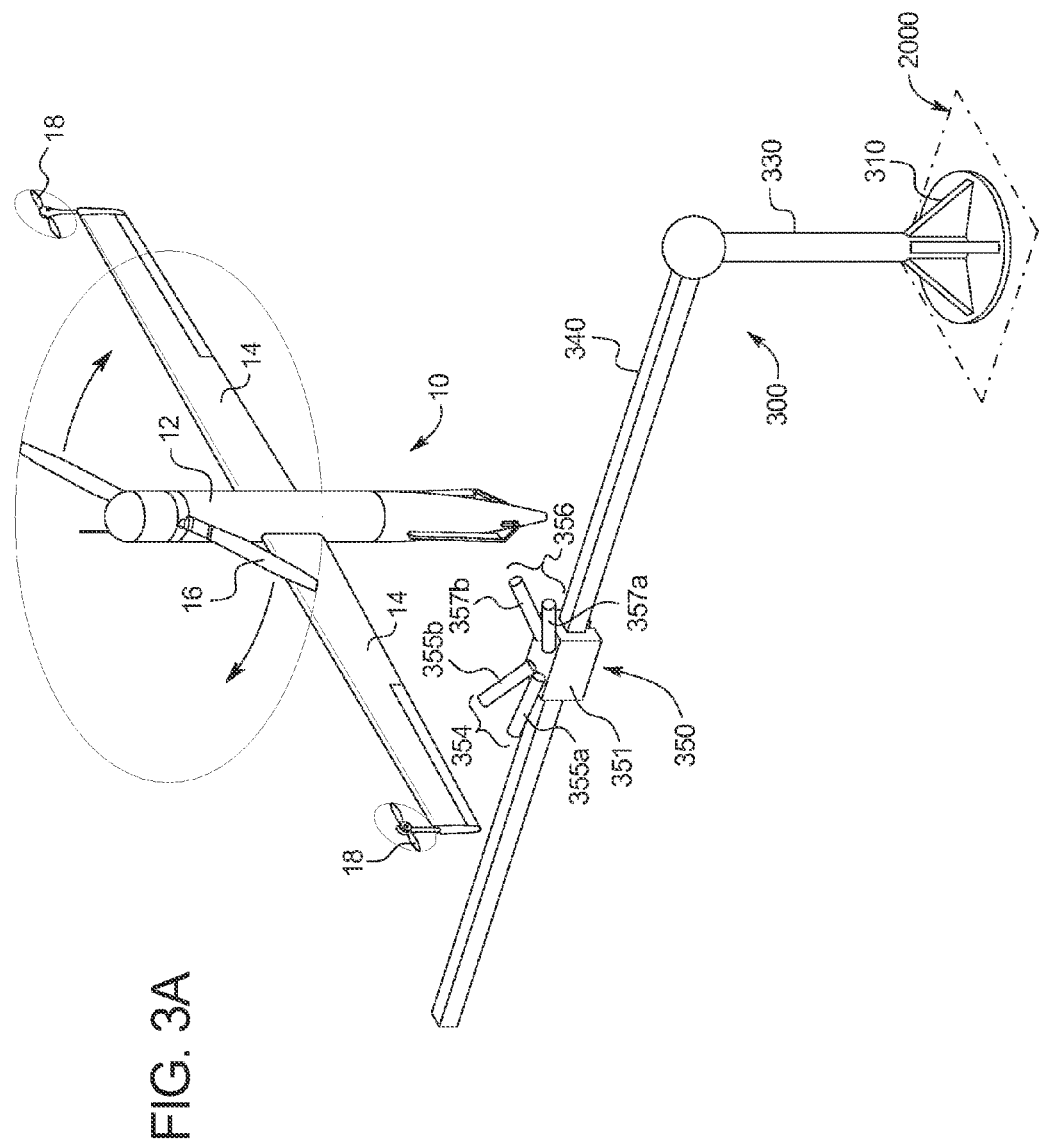
FIG. 3A illustrates an aircraft stationkeeping in the vicinity of another example embodiment of the apparatus of the present disclosure.
Figure 3E:
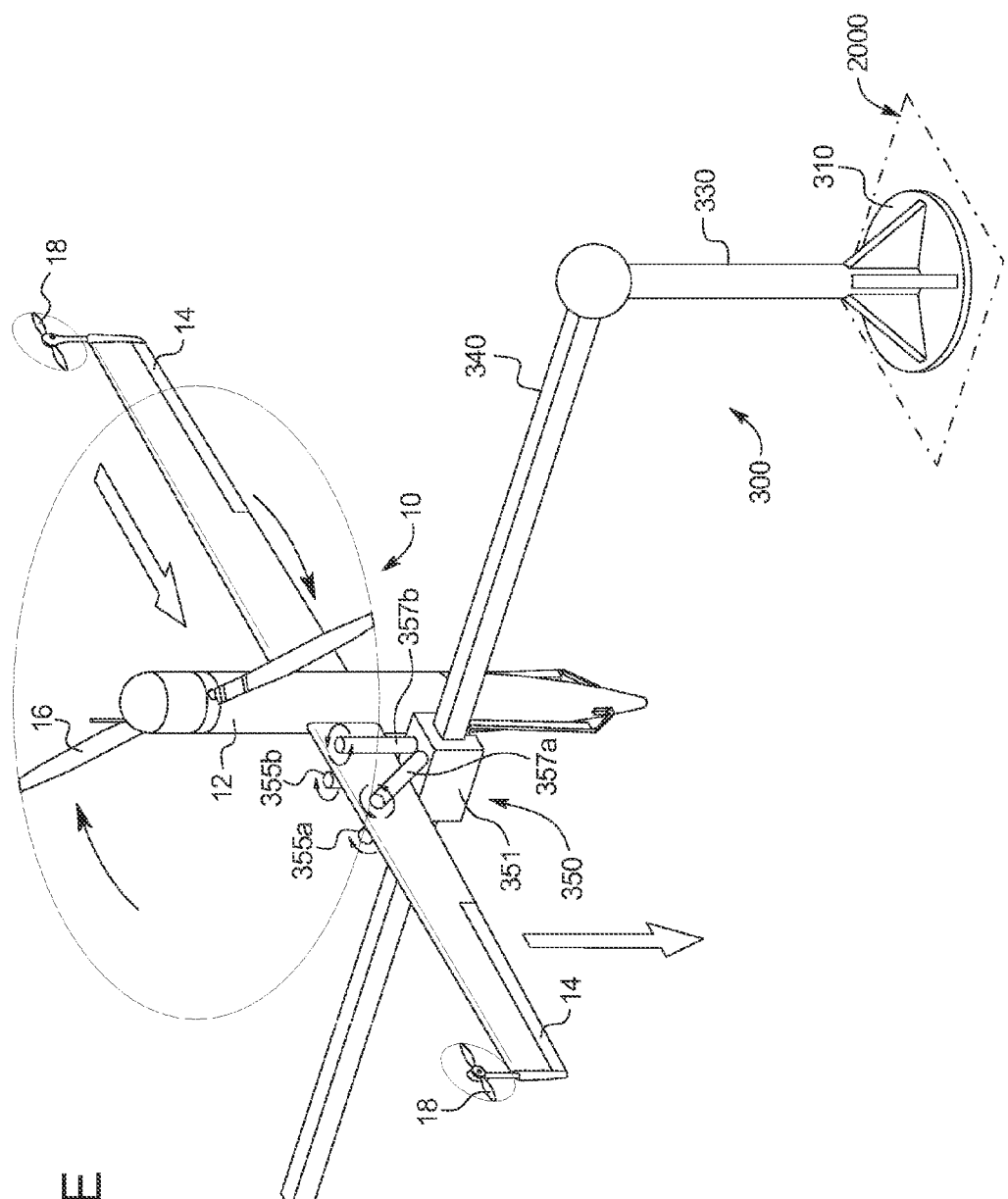
Figure 3G:
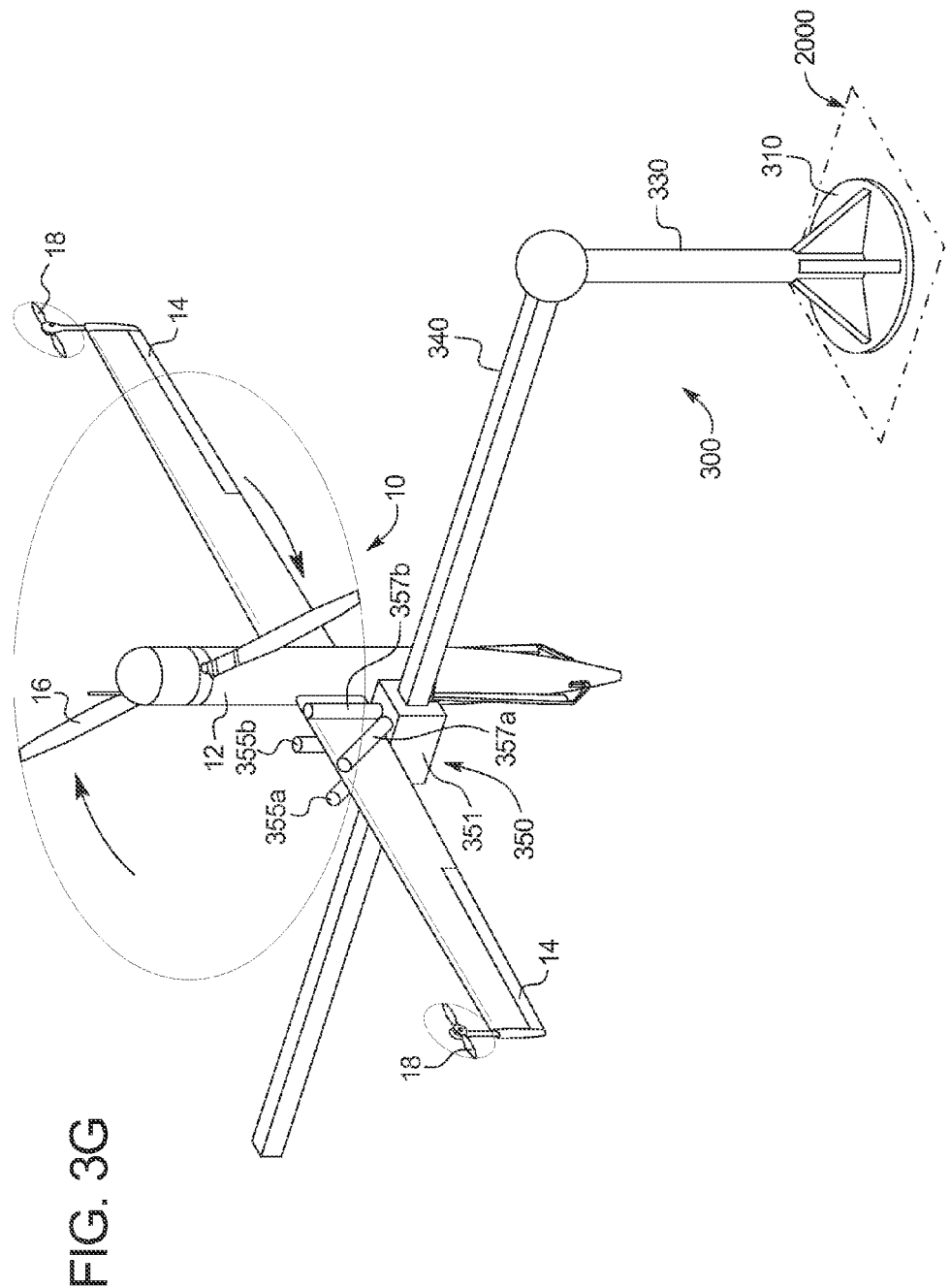
FIGS. 3G and 3H illustrate the aircraft in the desired position with respect to the aircraft capturer.
Figure 3H:
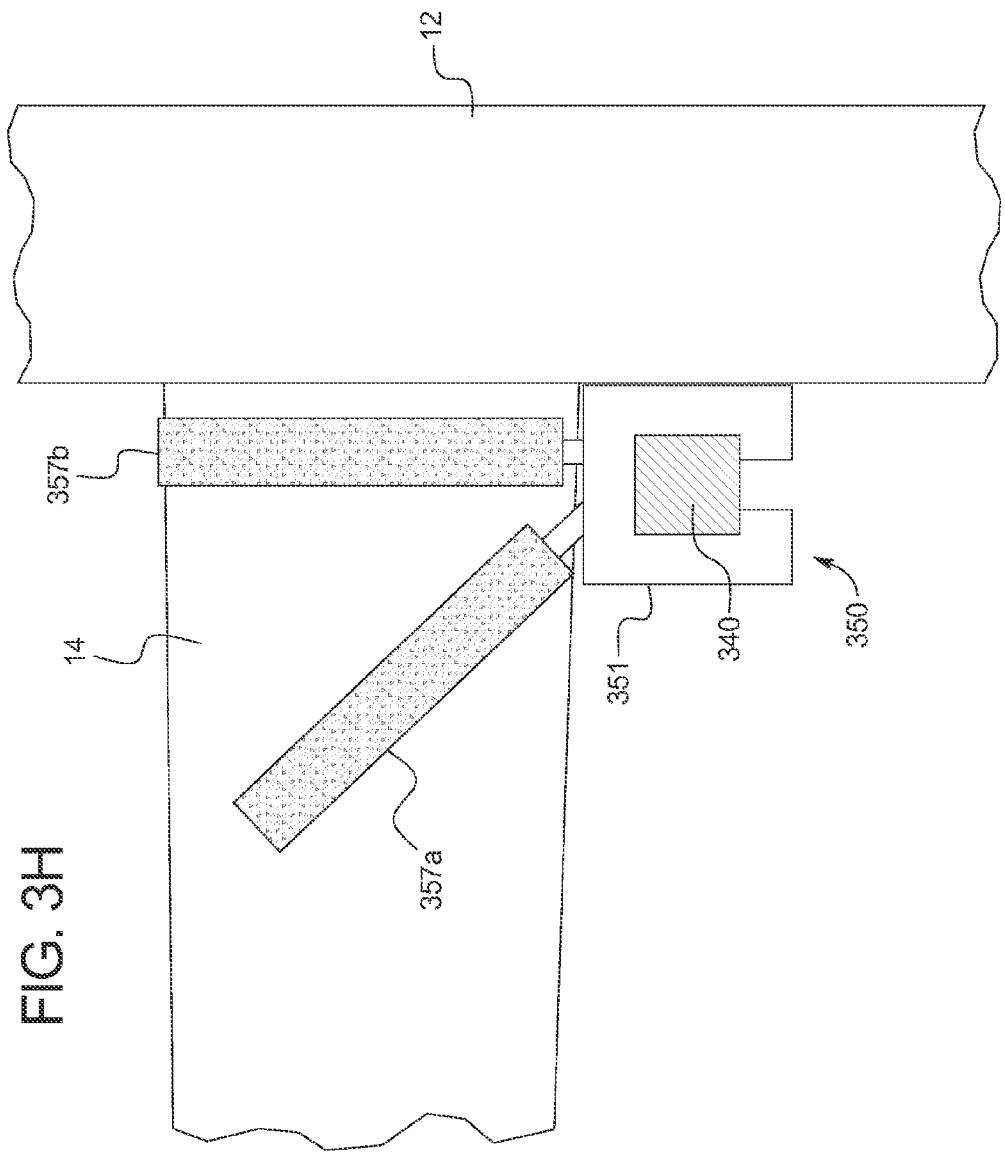
Figure 31:
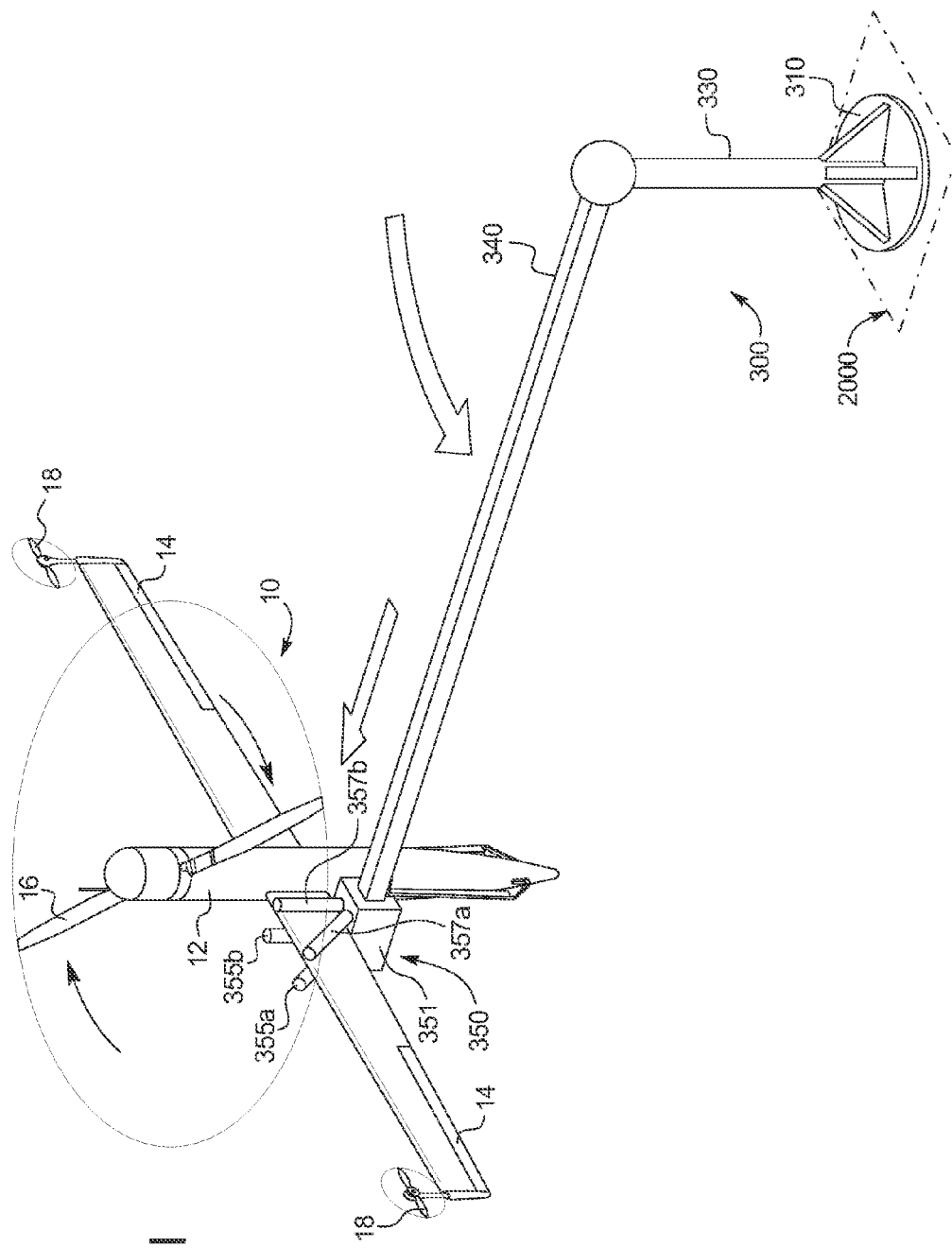
Figure 3J:
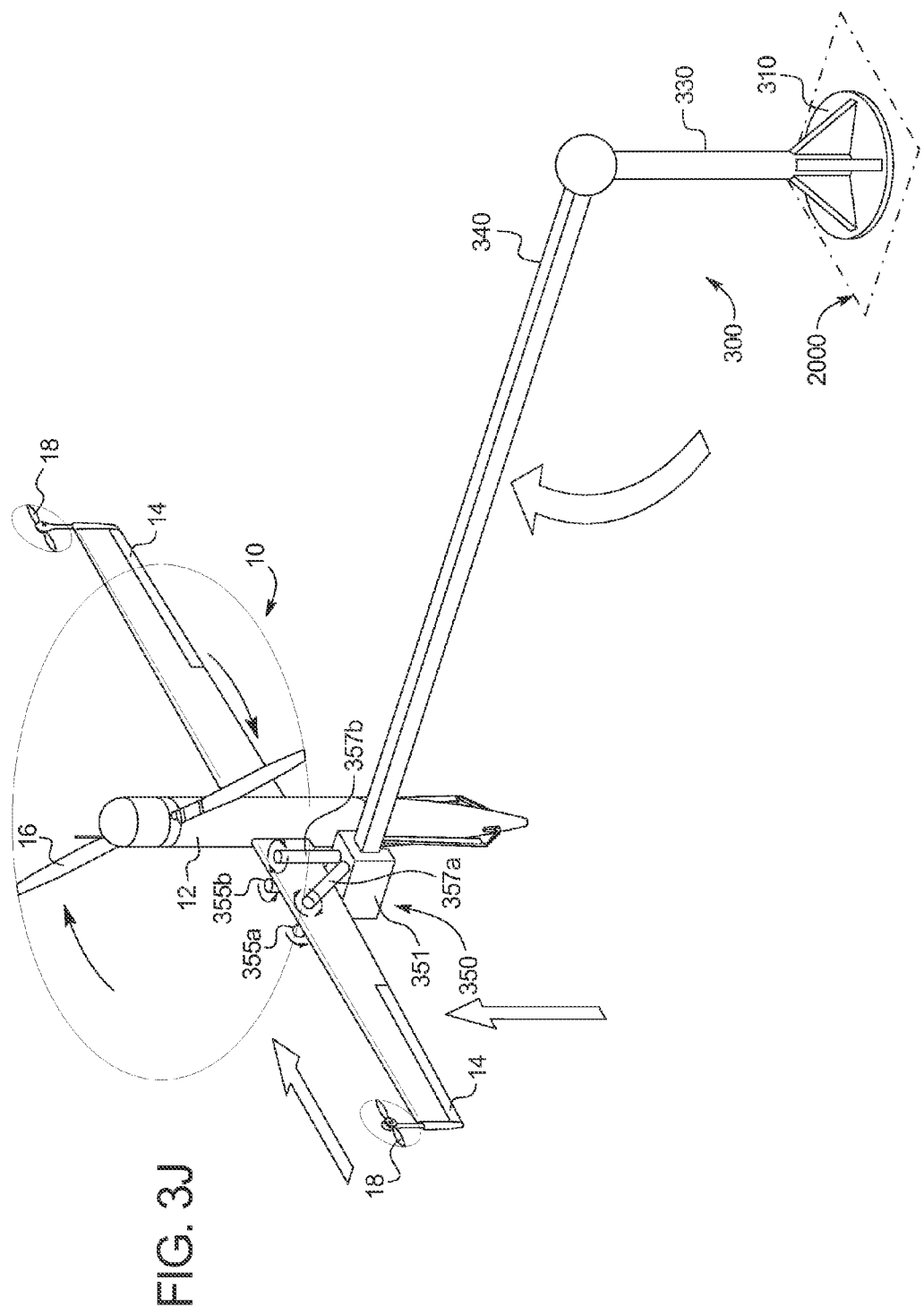
FIG. 3J illustrates the fingers of the apparatus of FIG. 3A spinning to cause the aircraft to move into a desired position for launch.
Figure 3K:
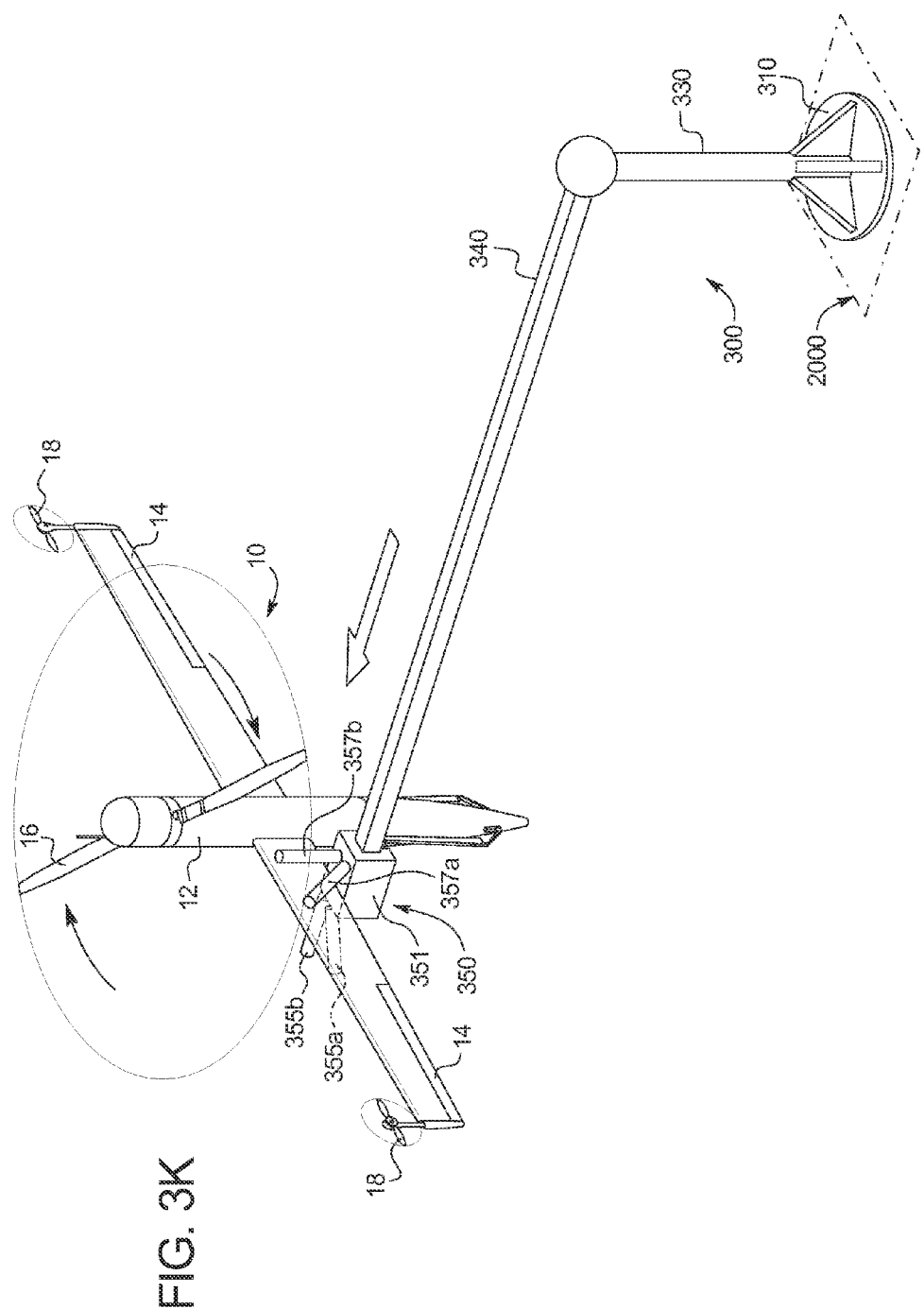

The jaws 354 and 356 have a capture configuration (as shown in FIG. 3A), a closed configuration (as shown in FIGS. 3B to 3J), and a launch configuration (as shown in FIGS. 3K and 3L). When in the capture configuration, the jaws (i.e., the respective planes including the axes through the fingers of the respective jaws) are approximately ninety degrees (or any other suitable angle) apart and each jaw is approximately forty-five degrees (or any other suitable angle) from the axis through the length of the upper arm 340. When in the closed configuration, the jaws are each approximately perpendicular to the axis through the length of the upper arm 340. When in the launch configuration, the jaw 354 is approximately parallel to the axis through the length of the upper arm 340 and the jaw 356 is approximately perpendicular to the axis through the length of the upper arm 340.

In this example embodiment, each of the fingers 355a, 355b, 357a, and 357b includes: (a) a generally solid support rotatably connected to the carriage 351 such that the finger may rotate relative to the carriage 351 about an axis through the length of the finger, (b) a cushioned material at least partially surrounding the support (as described above); and (c) a protective layer or coating of relatively high-friction material (as described above) substantially covering an outer surface of the cushioned material. In this example embodiment, for each of the fingers, the support of that finger includes a motor configured to spin that support (and, therefore that finger) around the axis through the length of that finger.

Although not shown, the apparatus 300 includes a controller configured to control movement of: (a) the upper arm 340; and (b) the aircraft capturer 350 (including the carriage 351, the jaws 354 and 356, and the fingers 355a. 355b, 357a, and 357b.

As illustrated in FIG. 3A, in preparation for capture, the upper arm 340 is maneuvered (rotated) such that it is substantially normal to the direction of the wind (if any) and to the centerline of the aircraft 10, and the jaws 354 and 356 are manipulated into the capture configuration. In this example embodiment, before and during capture, the upper arm 340 is maintained at substantially the same azimuthal position (though in other embodiments the upper arm may rotate before and/or during capture). The aircraft 10 approaches the apparatus 300 and, more specifically, the aircraft capturer 350, downwind at walking speed while regulating its altitude relative to the altitude of the upper arm 340. As the aircraft 10 approaches the aircraft capturer 350, the apparatus 300 (and, more specifically, the controller) automatically moves the aircraft capturer 350 along the upper arm 340 such that its axial position relative to the upper arm 340 substantially matches that of the aircraft 10.

As shown in FIGS. 3B, 3C, and 3D, the aircraft 10 is maneuvered such that one of the wings 14 is positioned between the jaws 354 and 356, which are then manipulated into the closed configuration such the jaws 354 and 356 capture the wing 14 (and, therefore, the aircraft 10) therebetween. As best shown in FIGS. 3C and 3D, after capture, the aircraft 10 is not typically in a desired position with respect to the aircraft capturer 350. More specifically, the aircraft 10 is not typically positioned such that: (a) a bottom edge of the captured wing 14 contacts a top surface of the carriage 351, and (b) the fuselage 12 contacts a side surface of the carriage 351. Thus, in this example embodiment, as shown in FIGS. 3E and 3F, after the aircraft capturer 350 captures the aircraft 10, the fingers 357a. 357b, 355a, and 355b spin (via the respective motors) such that they draw the aircraft into the desired position. More specifically, in this example embodiment: (a) the fingers 357a and 357b each spin counter-clockwise around their respective axes through their respective lengths, and (b) the fingers 355a and 355b each spin clockwise around their respective axes through their respective lengths. This spin combined with the high-friction protective coating of the fingers draws the aircraft into the desired position proximate the aircraft capturer. Specifically, as shown in FIGS. 3G and 3H, the spinning of the fingers draws the aircraft 10: (a) downward until the bottom edge of the captured wing 14 contacts the top surface of the carriage 351, and (b) toward the upper arm 340 until the fuselage 12 contacts the side surface of the carriage 351. It should be appreciated that the fingers may spin in any suitable direction about any suitable axes (based on the orientation of the fingers) to draw the aircraft into the desired position.

In this example embodiment, once the aircraft capturer 350 captures the aircraft 10, the apparatus 300 constrains the azimuthal and radial components of the movement of the aircraft 10, while the main rotor 16 of the aircraft 10 continues to spin to support the weight of the aircraft 10 and to enable the aircraft 10 to continue regulating the altitude of the aircraft 10. The jaws 354 and 356 hold the aircraft 10 with enough force to prevent the aircraft 10 from pulling free.

As illustrated in FIG. 3I, after drawing the aircraft 10 into the desired position proximate the aircraft capturer 350, the apparatus 300 moves the aircraft capturer 350 along the upper arm 340 to the distal end of the upper arm 340 in preparation for docking. Though not shown, the apparatus 300 rotates the upper arm 340 to center the aircraft 10 over a docking station, at which point the altitude of the aircraft 10 is reduced, the apparatus 300 releases the aircraft 10, and the aircraft 10 drops into the docking station. Once in the docking station, the aircraft is shut down and the main rotor is stopped.

After any servicing is performed, the apparatus 300 launches of the aircraft 10 by substantially reversing the above-described process. More specifically, to launch the aircraft 10: (a) the aircraft 10 re-starts its engine (as described above); (b) the apparatus 300 automatically re-captures the aircraft 10; (c) the aircraft 10 pulls itself out of the docking station and stationkeeps near the surface 2000; (d) the fingers 357a, 357b, 355a, and 355a spin (via the motors) such that they push the aircraft 10 away from the aircraft capturer 350; and (e) as shown in FIGS. 3K and 3L: (i) the jaws 354 and 356 are manipulated into the launch configuration, and (ii) the aircraft capturer moves toward the distal end of the arm 340 to push the aircraft 10 into free thrust-borne flight. The aircraft capturer and arm then quickly move away from the aircraft 10.

In certain embodiments, the apparatus is configured to vary the altitude of the upper arm. In one such embodiment, the apparatus is configured to track the altitude of the bottom edge of the wing of the aircraft and set the altitude of the upper arm to match that of the bottom edge of the wing.

It should be appreciated that any suitable mechanisms may be employed to: (a) rotate the upper arm; (b) axially move the aircraft capturer along the upper arm; (c) manipulate the jaws into the capture, closed, and launch configurations; and (d) cause the fingers to rotate.

In certain embodiments, the apparatus is configured to measure any suitable parameters or properties of the aircraft (as described above). In other embodiments, the apparatus monitors the position of the aircraft relative to the aircraft capturer (as described above) and automatically moves the aircraft capturer based on the monitored position of the aircraft. Put differently, in these embodiments, the aircraft capturer follows or tracks axial movement (relative to the upper arm) of the aircraft by axially sliding along the upper arm as the aircraft approaches the aircraft capturer for capture.

Fourth Example Embodiment

In this example embodiment, the apparatus of the present disclosure is configured to cause the aircraft capturer to capture a fuselage of the aircraft between two fingers and automatically draw the captured aircraft into a desired position proximate the aircraft capturer by spinning the fingers.

Turning back to the Figures, FIGS. 4A to 4E illustrate this example embodiment of the apparatus, which is generally indicated by numeral 400 and includes: (a) a base 410 anchored or otherwise attached to the surface 2000; (b) a substantially vertical lower or first arm 430 extending from the base 410; (c) an upper arm 440 rotatably connected to an upper end of the lower arm 430 such that upper arm 440 is: (i) substantially perpendicular to the lower arm 430, and (ii) configured to rotate relative to the lower arm 430 about a substantially vertical axis through the center of the lower arm 430; (d) an aircraft capturer 450 mounted to the upper arm 440 such that the aircraft capturer is configured to move axially along the upper arm 440; and (e) a wing restraint 460 pivotably connected to a distal end of the upper arm 440 such that the wing restraint 460 is configured to pivot about a substantially horizontal axis through the connection to the upper arm 440.

The aircraft capturer 450 includes a carriage 451 configured to move axially along the upper arm 440. The carriage 451 supports first finger 453 above, substantially coplanar with, and substantially parallel to the axis through the length of the upper arm 440. The first finger 453 includes: (a) a roller motor 452 connected to the carriage 451 such that the first finger 453 may spin relative to the carriage 451 (when the roller motor 452 is operated) about an axis through the length of the roller motor 452; (b) a cushioned material at least partially surrounding the roller motor 452 (as described above); and (c) a protective layer or coating of high-friction material (as described above) substantially covering an outer surface of the cushioned material. The carriage 451 also supports a second finger 454 that includes: (a) a generally solid support rotatably connected to the carriage 451 such that the second finger 454 may spin relative to the carriage 451 about an axis through the length of the second finger 454; (b) a cushioned material at least partially surrounding the support (as described above); and (c) a protective layer or coating of high-friction material (as described above) substantially covering an outer surface of the cushioned material.

Figure 4B:
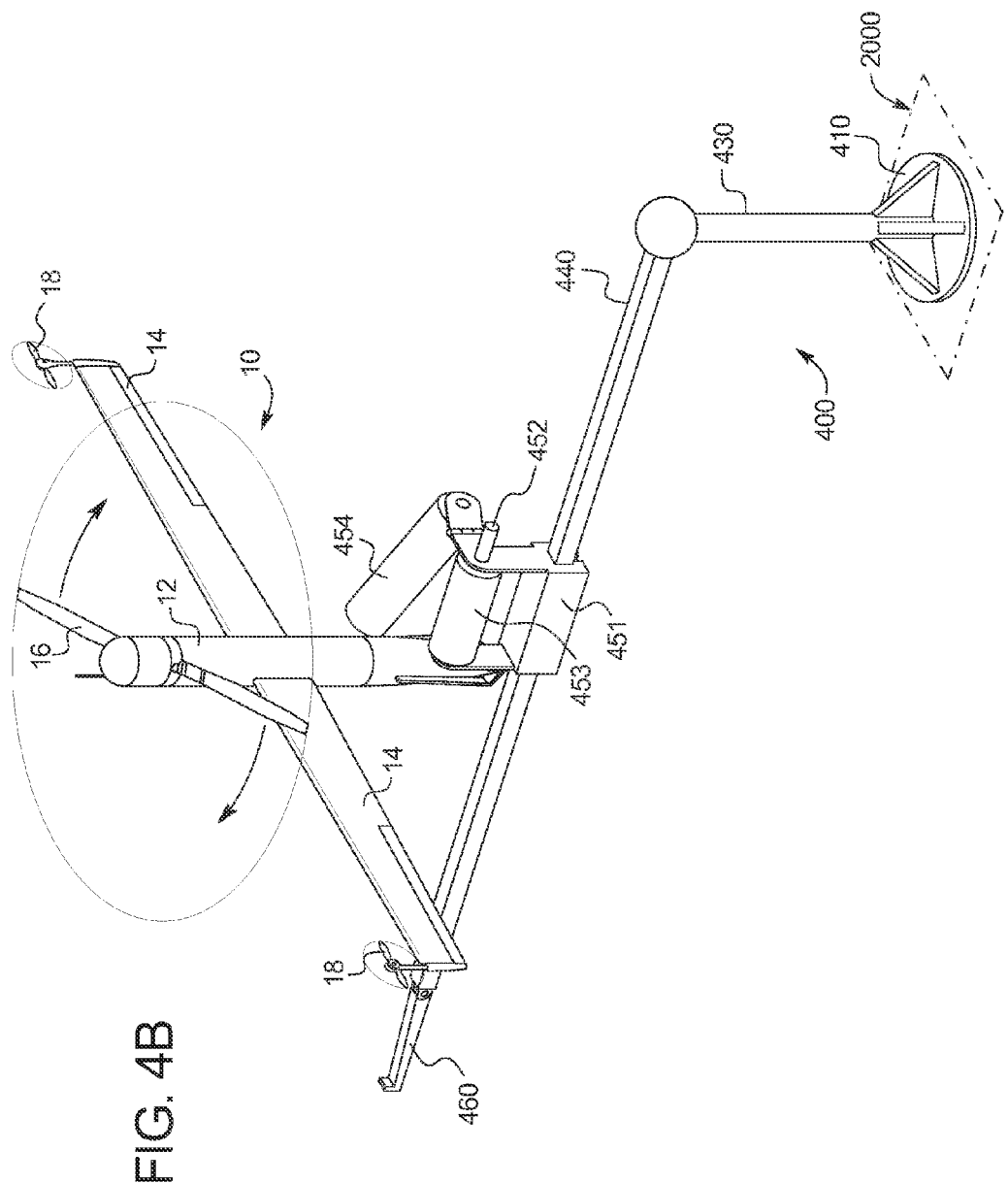
FIG. 4B illustrates the aircraft contacting the fingers of the aircraft capturer of the apparatus of FIG. 4A.
Figure 4C:
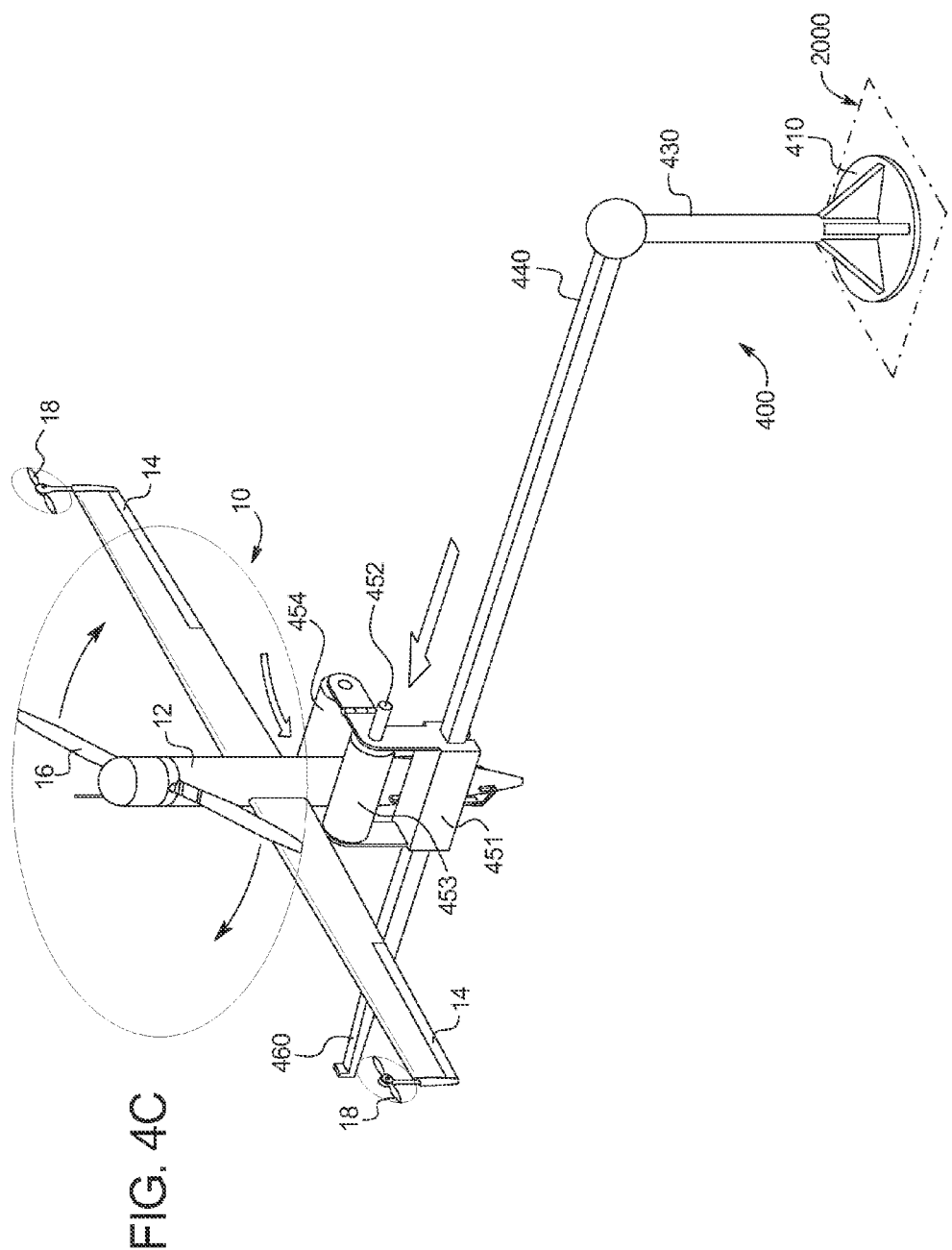
FIG. 4C illustrates the apparatus of FIG. 4A sliding the aircraft capturer toward the distal end of the upper arm to capture the aircraft.
Figure 4D:
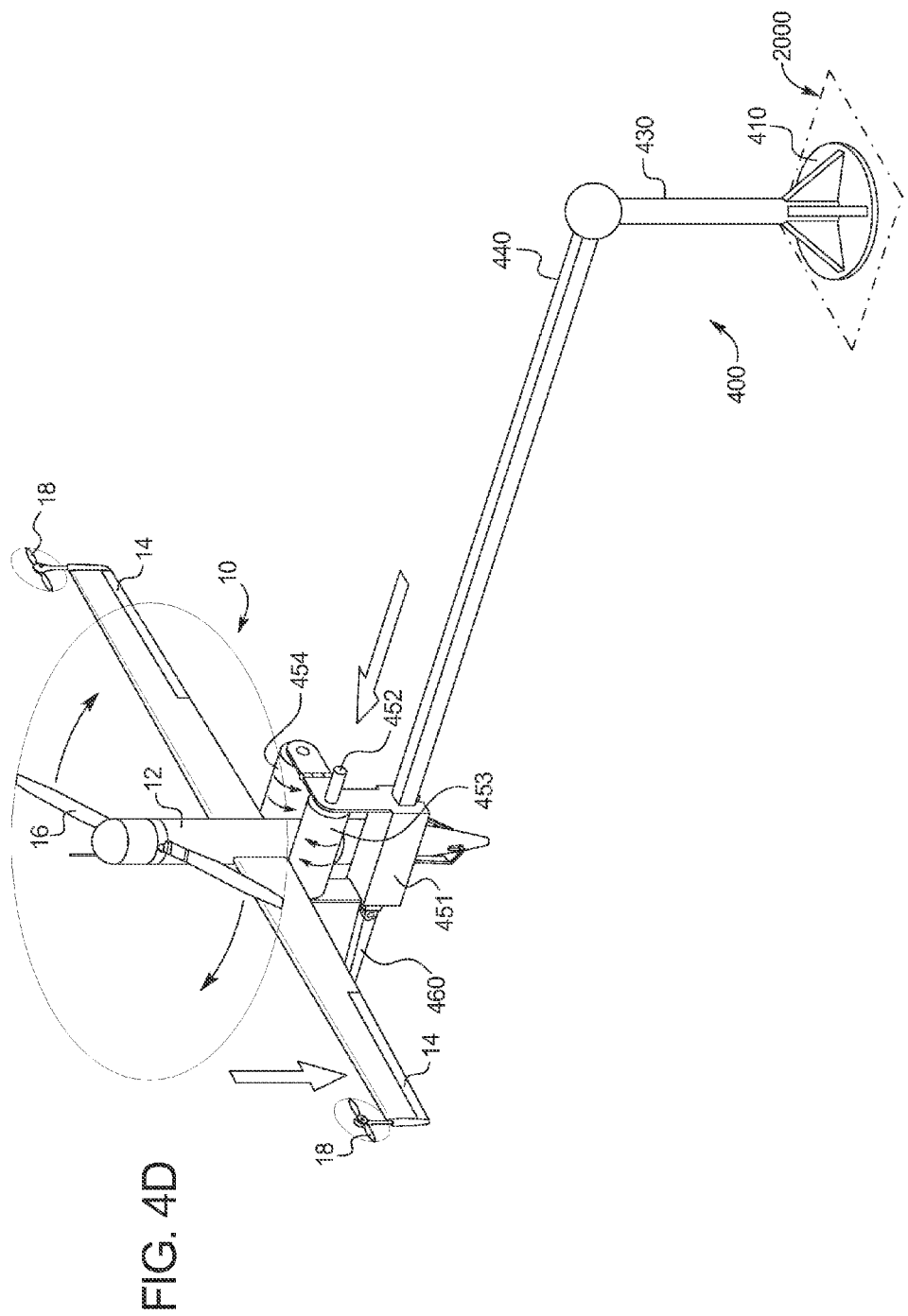
FIG. 4D illustrates the fingers of the apparatus of FIG. 4A spinning to cause the aircraft to move into a desired position with respect to the aircraft capturer.

In this example embodiment, the axes through the lengths of the first and second fingers 453 and 454 are substantially coplanar. The second finger 454 is offset from the first finger 453 and pivotably connected to the carriage 451 such that: (a) when the first and second fingers 453 and 454 are in a closed configuration (as shown in FIGS. 4C to 4E), the axes through the lengths of the first and second fingers are substantially parallel; and (b) when the first and second fingers are in an open configuration (as shown in FIGS. 4A and 4B), the angle formed between the axes through the lengths of the first and second fingers is sized such that the mouth of the opening formed between the fingers is about twice the diameter of the fuselage 12 of the aircraft 10 (or any other suitable angle, such as an approximately ninety degree angle or an angle greater than ninety degrees).

It should be appreciated that the configuration and relative locations of the fingers are merely one of a variety of different configurations and relative locations contemplated by the present disclosure. For instance, in another embodiment, the fingers are not offset from one another. In another embodiment, the axes through the lengths of the fingers are not substantially coplanar.

Although not shown, the apparatus 400 includes a controller configured to control movement of: (a) the upper arm 440; (b) the aircraft capturer 450 (including the carriage 451, the roller motor 452, and the second finger 454); and (c) the wing restraint 460.

As illustrated in FIG. 4A, in preparation for capture, the upper arm 440 is maneuvered (rotated) such that it is substantially normal to the direction of the wind (if any) and to the centerline of the aircraft 10, and the fingers 453 and 454 are manipulated into the open configuration. The aircraft 10 approaches the apparatus 400 and, more specifically, the aircraft capturer 450, downwind at walking speed while regulating its altitude relative to the altitude of the upper arm 440. As the aircraft 10 approaches the aircraft capturer 450, the apparatus 400 monitors the position (e.g., the altitude, azimuthal position, and radial position) of the aircraft 10 relative to the aircraft capturer 450 and rotates the upper arm 440 and/or moves the aircraft capturer 450 to follow or track the aircraft 10.

As shown in FIGS. 4B and 4C, when the aircraft 10 contacts one of the fingers 453 and 454, the fingers 453 and 454 are quickly manipulated into the closed configuration and the apparatus 400 slides the aircraft capturer 450 to the distal end of the upper arm 440, thereby capturing the fuselage 12 of the aircraft 10 (and, therefore, the aircraft 10 itself) therebetween. As best shown in FIG. 4C, after capture, the aircraft 10 is not typically in a desired position with respect to the aircraft capturer 450. More specifically, the aircraft 10 is not typically positioned such that the bottom edges of the wings 14 contact the fingers 453 and 454. Thus, in this example embodiment, as shown in FIG. 4D, after the aircraft capturer 450 captures the aircraft 10, the roller motor 452 operates to cause the finger 453 to spin clockwise. This spin combined with the high-friction protective coating of the fingers draws the aircraft 10 into the desired position proximate the aircraft capturer 450. Specifically, as shown in FIG. 4E, the spinning of the fingers draws the aircraft 10 downward until the bottom edges of the wings 14 contact the fingers 453 and 454. It should be appreciated that the fingers may spin in any suitable direction about any suitable axes (based on the orientation of the fingers) to draw the aircraft into the desired position. In another embodiment, the second finger includes a roller motor configured to cause that finger to spin. As also shown in FIG. 4E, after drawing the aircraft 10 into the desired position proximate the aircraft capturer 450, the apparatus 400 pivots the wing restraint 460 upward to further secure the aircraft 10.

In this example embodiment, once the aircraft capturer 450 captures the aircraft 10, the apparatus 400 constrains the azimuthal, radial, and attitude components of the movement of the aircraft 10 while the main rotor 16 of the aircraft 10 continues to spin to substantially support the weight of the aircraft 10 and to enable the aircraft 10 to continue regulating the altitude component of the movement of the aircraft 10. The fingers 453 and 454 hold the aircraft 10 with enough force to prevent the aircraft 10 from pulling free.

Though not shown, the apparatus 400 rotates the upper arm 440 to center the aircraft 10 over a docking station, at which point the altitude of the aircraft 10 is reduced, the apparatus 400 releases the aircraft 10, and the aircraft 10 drops into the docking station. Once in the docking station, the aircraft is shut down and the main rotor is stopped. After any servicing is performed on the aircraft 10, the apparatus 400 launches of the aircraft 10 by substantially reversing the above-described process. More specifically, to launch the aircraft 10: (a) the aircraft 10 re-starts its engine (as described above); (b) the apparatus 400 automatically re-captures the aircraft 10; (c) the aircraft 10 pulls itself out of the docking station and stationkeeps near the surface 2000; (d) the wing restraint 460 is pivoted downward; (e) the roller motor operates to cause the finger 453 to spin counter-clockwise, which pushes the aircraft 10 away from the aircraft capturer 450; and (f) when the aircraft 10 is sufficiently clear of any obstacles and is determined to be stationkeeping properly (e.g., no sag is detected in the upper arm 440), the apparatus 400 manipulates the fingers 453 and 454 into the open configuration to release the aircraft 10 into free thrust-borne flight while quickly maneuvering away from the aircraft 10.

In certain embodiments, the apparatus is configured to vary the altitude of the upper arm. In one such embodiment, the apparatus is configured to track the altitude of the bottom edge of the wing of the aircraft and set the altitude of the upper arm to match that of the bottom edge of the wing.

It should be appreciated that any suitable mechanisms may be employed to: (a) rotate the upper arm; (b) axially move the aircraft capturer along the upper arm; (c) manipulate the fingers into the open and closed configurations; and (d) operate the roller motor.

In certain embodiments, the apparatus is configured to measure any suitable parameters or properties of the aircraft (as described above).

VARIATIONS

It should be appreciated that the apparatus may be attached to any suitable surface, such as a static surface or a moving surface.

It should be appreciated that any of the joints described herein as revolute joints, ball-and-socket joints, or any other type of joint may be replaced with any other suitable type of joint to provide a different type of movement of the components of the apparatus.

In various embodiments, the docking station is coupled to the apparatus, such as coupled to the base of the apparatus. In other embodiments, the docking station is coupled to a surface within reach of the apparatus, such as the surface to which the base of the apparatus is anchored. In one such example embodiment, the apparatus and the docking station form an aircraft retrieval system.

In certain embodiments, as the apparatus guides the aircraft into the docking station, one or more servicing connections to automatically provide (or remove) fuel, oil, electricity, and the like to (or from) the aircraft are made. Alternatively, such connections are made after the aircraft is secured in the docking station. This enables the aircraft automatically to be serviced in preparation for launch.

In certain instances, such as when the aircraft is not going to be launched for a relatively substantial period of time, after the aircraft is secured in the docking station, the apparatus releases the aircraft. The apparatus may then automatically maneuver the aircraft capturer and any other suitable components elsewhere, such as into a stowed configuration. In other instances, such as when the aircraft is going to be launched in a relatively short amount of time, the aircraft capturer continues holding the aircraft while the aircraft is being recharged and/or refueled in preparation for launch.

Due to winds, the spinning of the main rotor and the thrusters, and movement of the surface to which the apparatus is attached, the aircraft is constantly moving. In certain embodiments, the apparatus does not automatically maneuver the aircraft capturer to follow the aircraft unless the movement of the aircraft relative to the aircraft capturer exceeds a designated threshold. For instance, in an embodiment in which the apparatus is configured to measure the position of the aircraft on the order of centimeters, any movements less than one centimeter will not be followed or tracked. It should be appreciated that the designated threshold may be set such that the apparatus does not maneuver the aircraft capturer to follow the aircraft unless the movement of the aircraft is more than negligible.

In certain embodiments, the apparatus includes a manual override that, if activated, enables a user to manually control the movement of one, a plurality of but less than all of, or all of the components of the apparatus rather than having the apparatus automatically control the movement of some or all of the components of the apparatus. In other words, these embodiments enable a user to switch from a fully automated capture, dock, and launch cycle to one that is at least partially manual.

In other embodiments, the apparatus is configured to receive measurements of one or more of the parameters of the aircraft (such as: (a) the altitude of the aircraft; (b) the azimuthal position of the aircraft; (c) the radial position of the aircraft; (d) the global position of the aircraft; (e) the components of the velocity of the aircraft; (f) the components of the velocity of the aircraft relative to any suitable point; and (g) the attitude of the aircraft) from a source external to the apparatus. For instance, in one example embodiment, the aircraft itself measures certain parameters and sends such measurements to the apparatus.

It should be appreciated that, in other embodiments, the apparatus is configured to support the entire weight of the aircraft after capture and, therefore, the aircraft may shut off its rotor and power down after capture.

It should be appreciated that the sizes and shapes of the various components may vary from those described herein and illustrated in the Figures.

It should be appreciated that any suitable features of any of the above-described embodiments may be combined.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for retrieving an aircraft from free thrust-borne flight, the method comprising:
   (a) hovering the aircraft such that a spanwise fixture of the aircraft is positioned over a boom;
   (b) sliding a fixture capturer along the boom until the fixture capturer is positioned below the spanwise fixture, the fixture capturer including a first capture member and a second capture member in an open configuration; and
   (c) moving the first and second capture members from the open configuration into a closed configuration such that the spanwise fixture is captured between the first and second capture members.

2. The method of claim 1, which includes, after the spanwise fixture is captured between the first and second capture members, sliding the fixture capturer along the boom to position the aircraft in preparation for docking.

3. The method of claim 2, which includes maneuvering the aircraft into a docking station.

4. The method of claim 3, which includes shutting down an engine of the aircraft after the aircraft is in the docking station.

5. The method of claim 1, which includes, while the spanwise fixture is captured between the first and second capture members, rotating at least one of the first and second capture members to draw the aircraft into a designated position relative to the aircraft capturer.

6. A method for launching an aircraft into free thrust-borne flight, the method comprising:
   (a) starting an engine of the aircraft;
   (b) while a spanwise fixture of the aircraft is captured between first and second capture members of a fixture capturer in a closed configuration, sliding the fixture capturer along the boom to a launch position; and
   (c) manipulating the first and second capture members from the closed configuration into an open configuration to release the aircraft into free thrust-borne flight.

7. The method of claim 6, which includes, while the spanwise fixture is captured between the first and second capture members, rotating at least one of the first and second capture members to position the aircraft into a designated position relative to the aircraft capturer.

8. An aircraft retrieval apparatus comprising:
   a boom;
   a fixture capturer slidably mounted to the boom, the fixture capturer including first and second capture members movable from an open configuration to a closed configuration; and
   a controller configured to, while the aircraft is hovering such that a spanwise fixture of the aircraft is positioned over the boom, cause the fixture capturer to slide along the boom until the fixture capturer is positioned below the spanwise fixture and cause the first and second capture members to move from the open configuration to the closed configuration to capture the spanwise fixture therebetween.

9. The apparatus of claim 8, wherein the first and second capture members each include: (a) a support, (b) a cushioned material at least partially surrounding the support, and (c) a protective coating disposed on an outer surface of the cushioned material.

10. The apparatus of claim 8, further including:
    a base; and
    a lower arm connected at a first end to the base and at a second end to the boom.

11. The apparatus of claim 8, wherein a first angle separates the first and second capture members when in the open configuration and a second smaller angle separates the first and second capture members when in the closed configuration.

12. The apparatus of claim 8, wherein the first and second capture members are substantially collinear when in the open configuration.

13. The apparatus of claim 8, wherein the first and second capture members are substantially coplanar when in the open configuration.

14. The apparatus of claim 8, wherein the first and second capture members are substantially parallel when in the closed configuration.

15. The apparatus of claim 8, which includes one or more sensors configured to measure the position of the aircraft relative to the fixture capturer.

16. The apparatus of claim 14, wherein the controller is configured to cause the fixture capturer to slide based at least in part on feedback from the one or more sensors.

* * * * *